US012691727B2

(12) United States Patent
    Okamura et al.

(10) Patent No.:   US 12,691,727 B2
(45) Date of Patent:        Jul. 28, 2026

(54) REFRIGERATION CYCLE DEVICE

(71) Applicant: DENSO CORPORATION, Kariya-city (JP)

(72) Inventors: Toru Okamura, Kariya-city (JP);
               Atsushi Yamada, Kariya-city (JP);
               Yoshiki Katoh, Kariya-city (JP);
               Hiroaki Kawano, Kariya-city (JP)

(73) Assignee: DENSO CORPORATION, Kariya-city (JP)

( * ) Notice:   Subject to any disclaimer, the term of this patent is extended or adjusted under 35 U.S.C. 154(b) by 804 days.

(21) Appl. No.: 18/185,204

(22) Filed:     Mar. 16, 2023

(65)            Prior Publication Data

US 2023/0219398 A1      Jul. 13, 2023

Related U.S. Application Data

(63) Continuation       of       application       No. PCT/JP2021/029344, filed on Aug. 6, 2021.

(30)        Foreign Application Priority Data

Sep. 22, 2020    (JP) ................................. 2020-158031

(51) Int. Cl.
     *B60H 1/22*        (2006.01)
     *B60H 1/32*        (2006.01)
(52) U.S. Cl.
     CPC ............. *B60H 1/22* (2013.01); *B60H 1/3228* (2019.05)
(58) Field of Classification Search
     USPC .......................................................... 237/5
     See application file for complete search history.

(56)            References Cited

U.S. PATENT DOCUMENTS

| 2018/0208019 | A1  | 7/2018  | Sugimura et al. | |
| 2020/0164719 | A1  | 5/2020  | Shiratori et al. | |
| 2020/0254848 | A1* | 8/2020  | Semel ................... | F25D 21/006 |
| 2020/0346520 | A1* | 11/2020 | Ishizeki ............. | B60H 1/00328 |
| 2021/0309075 | A1* | 10/2021 | Hasegawa ........... | H01M 10/633 |

FOREIGN PATENT DOCUMENTS

| JP | 2017081530 | A  | 5/2017  |
| JP | 2017128223 | A  | 7/2017  |
| JP |    6399060 | B2 | 10/2018 |
| JP | 2019026111 | A  | 2/2019  |
| JP | 2019108031 | A  | 7/2019  |

* cited by examiner

*Primary Examiner* — Steven B Mcallister
*Assistant Examiner* — John E Bargero
(74) *Attorney, Agent, or Firm* — Harness, Dickey & Pierce, P.L.C.

(57)            ABSTRACT

A refrigeration cycle device includes a flow path switching unit configured to determine whether an outside-air heat absorption unit is required to be defrosted. The flow path switching unit is further configured to: cause a heat medium to circulate separately between a first circulation circuit configured to cause the heat medium to circulate through a heat source and a second circulation circuit configured to cause the heat medium to circulate between an evaporation unit and the outside-air heat absorption unit, when it is determined that the outside-air heat absorption unit is not required to be defrosted; and switch a flow path of the heat medium to cause the heat medium in the first circulation circuit to circulate through the outside-air heat absorption unit, when it is determined that the outside-air heat absorption unit is required to be defrosted.

7 Claims, 11 Drawing Sheets

REFRIGERATION CYCLE DEVICE

CROSS REFERENCE TO RELATED APPLICATION

The present application is a continuation application of International Patent Application No. PCT/JP2021/029344 filed on Aug. 6, 2021, which designated the U.S. and claims the benefit of priority from Japanese Patent Application No. 2020-158031 filed on Sep. 22, 2020. The entire disclosures of all of the above applications are incorporated herein by reference.

TECHNICAL FIELD

The present disclosure relates to a refrigeration cycle device that absorbs heat from outside air.

BACKGROUND ART

A heat pump system includes a low-temperature radiator (LT radiator) serving as an outside-air heat absorber. In the LT radiator, a coolant cooled by a refrigerant in a chiller absorbs heat from outside air. The coolant temperature when the coolant is cooled in the chiller may be equal to or lower than 0° C. When the coolant temperature is equal to or lower than 0° C., moisture in the outside air is solidified on the surface of the LT radiator. Frost thus adheres to the surface of the LT radiator (so-called frosting).

SUMMARY

According to an aspect of the present disclosure, a refrigeration cycle device includes a compressor, a heat radiation unit, a decompression unit, an evaporation unit, an outside-air heat absorption unit, a heat source, a first circulation circuit, a second circulation circuit, and a flow path switching unit.

The compressor is configured to suck, compress, and discharge a refrigerant. The heat radiation unit is configured to cause the refrigerant discharged from the compressor to release heat. The decompression unit is configured to decompress the refrigerant having released heat in the heat radiation unit. The evaporation unit is configured to exchange heat between the refrigerant decompressed in the decompression unit and a heat medium to evaporate the refrigerant and to cool the heat medium.

The outside-air heat absorption unit is configured to cause the heat medium cooled in the evaporation unit to absorb heat from outside air. The heat source is configured to release heat to the heat medium to heat the heat medium. The first circulation circuit is configured to cause the heat medium to circulate through the heat source. The second circulation circuit is configured to cause the heat medium to circulate between the evaporation unit and the outside-air heat absorption unit.

The flow path switching unit is configured to determine whether the outside-air heat absorption unit is required to be defrosted. The flow path switching unit is configured to: cause the heat medium to circulate separately between the first circulation circuit and the second circulation circuit, when it is determined that the outside-air heat absorption unit is not required to be defrosted; and switch a flow path of the heat medium to cause the heat medium in the first circulation circuit to circulate through the outside-air heat absorption unit, when it is determined that the outside-air heat absorption unit is required to be defrosted.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
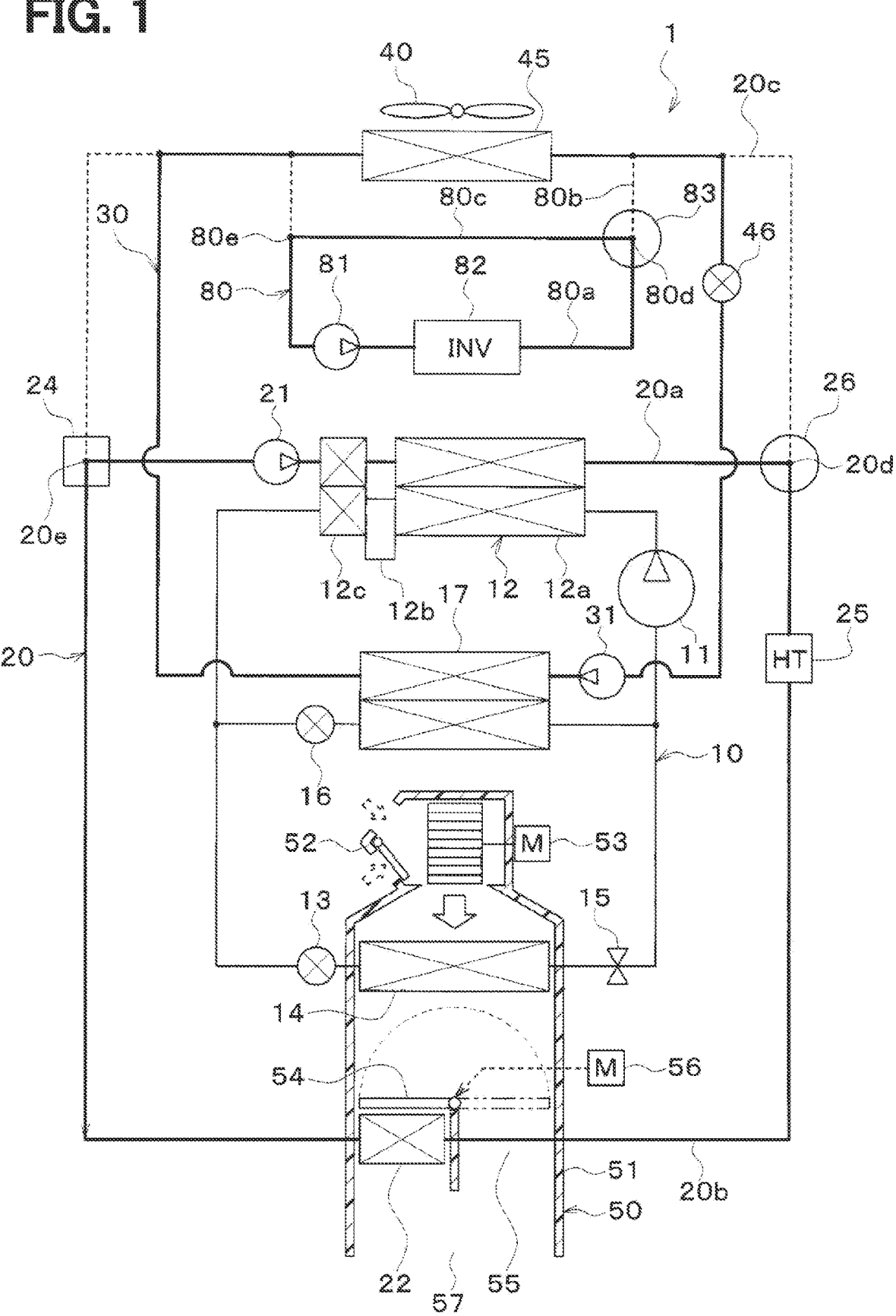
FIG. 1 is an overall configuration diagram of a refrigeration cycle device in a first embodiment.

A conventional heat pump system includes a low-temperature radiator (LT radiator) serving as an outside-air heat absorber. In the LT radiator, a coolant cooled by a refrigerant in a chiller absorbs heat from outside air. The coolant temperature when the coolant is cooled in the chiller may be equal to or lower than 0° C. When the coolant temperature is equal to or lower than 0° C., moisture in the outside air is solidified on the surface of the LT radiator. Frost thus adheres to the surface of the LT radiator (so-called frosting).

In this conventional technique, a coolant heated by a water-cooled condenser is supplied to the LT radiator, and the frost adhering to the surface of the LT radiator is melted and removed (so-called defrosting).

In the conventional technique described above, mention is not made of a perspective on when and how to perform the defrosting in order to make the defrosting the most efficient defrosting, as a heat pump system (that is, a refrigeration cycle device that absorbs heat from outside air).

The present disclosure provides a refrigeration cycle device to perform defrosting as efficiently as possible in a refrigeration cycle device that absorbs heat from outside air.

According to an aspect of the present disclosure, a refrigeration cycle device includes a compressor, a heat radiation unit, a decompression unit, an evaporation unit, an outside-air heat absorption unit, a heat source, a first circulation circuit, a second circulation circuit, and a flow path switching unit.

The compressor is configured to suck, compress, and discharge a refrigerant. The heat radiation unit is configured to cause the refrigerant discharged from the compressor to release heat. The decompression unit is configured to decompress the refrigerant having released heat in the heat radiation unit. The evaporation unit is configured to exchange heat between the refrigerant decompressed in the decompression unit and a heat medium to evaporate the refrigerant and to cool the heat medium.

The outside-air heat absorption unit is configured to cause the heat medium cooled in the evaporation unit to absorb heat from outside air. The heat source is configured to release heat to the heat medium to heat the heat medium. The first circulation circuit is configured to cause the heat medium to circulate through the heat source. The second circulation circuit is configured to cause the heat medium to circulate between the evaporation unit and the outside-air heat absorption unit.

The flow path switching unit is configured to determine whether the outside-air heat absorption unit is required to be defrosted. The flow path switching unit is configured to: cause the heat medium to circulate separately between the first circulation circuit and the second circulation circuit, when it is determined that the outside-air heat absorption unit is not required to be defrosted; and switch a flow path of the heat medium to cause the heat medium in the first circulation circuit to circulate through the outside-air heat absorption unit, when it is determined that the outside-air heat absorption unit is required to be defrosted.

Accordingly, it is possible to efficiently perform defrosting since the defrosting is secured to be performed when it is necessary to defrost the outside-air heat absorption unit.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

An embodiment will be described below with reference to the drawings. A vehicular air-conditioning system 1 illustrated in FIG. 1 is an air-conditioning system that adjusts a temperature of a space in a cabin of a vehicle (that is, an air-conditioning target space) to an appropriate temperature. The vehicular air-conditioning system 1 includes a refrigeration cycle device 10.

The refrigeration cycle device 10 is mounted in an electric vehicle, a hybrid vehicle, or the like. The electric vehicle obtains a driving force for vehicle traveling from an electric motor for vehicle traveling. The hybrid vehicle obtains a driving force for vehicle traveling from an engine (that is, an internal combustion engine) and an electric motor for vehicle traveling.

The refrigeration cycle device 10 is a vapor-compression refrigerator, and includes a compressor 11, a condenser 12, a first expansion valve 13, an air-side evaporator 14, a constant-pressure valve 15, a second expansion valve 16, and a coolant-side evaporator 17. The refrigeration cycle device 10 in the present embodiment uses a fluorocarbon refrigerant as a refrigerant, and forms a subcritical refrigeration cycle in which a high-pressure-side refrigerant pressure does not exceed a critical pressure of the refrigerant.

The second expansion valve 16 and the coolant-side evaporator 17 are disposed in parallel with the first expansion valve 13, the air-side evaporator 14, and the constant-pressure valve 15, in a flow of the refrigerant.

In the refrigeration cycle device 10, a first refrigerant circulation circuit and a second refrigerant circulation circuit are formed. In the first refrigerant circulation circuit, the refrigerant circulates through the compressor 11, the condenser 12, the first expansion valve 13, the air-side evaporator 14, the constant-pressure valve 15, and the compressor 11, in this order. In the second refrigerant circulation circuit, the refrigerant circulates through the compressor 11, the condenser 12, the second expansion valve 16, and the coolant-side evaporator 17, in this order.

The compressor 11 is an electric compressor that is driven by power supplied from a battery. The compressor 11 sucks, compresses, and discharges the refrigerant in the refrigeration cycle device 10. The compressor 11 has an electric motor, which is controlled by a controller 60 illustrated in FIG. 2. The compressor 11 may be a variable displacement compressor that is driven by a belt.

The condenser 12 is a high-pressure-side heat exchanger that exchanges heat between a high-pressure-side refrigerant discharged from the compressor 11 and a coolant in a high-temperature coolant circuit 20. The condenser 12 is a heat radiation unit that exchanges heat between the refrigerant discharged from the compressor 11 and the coolant, to cause the refrigerant to release heat and heat the coolant.

When the refrigeration cycle device 10 is mounted in the electric vehicle, the compressor 11 and the condenser 12 are disposed in a motor room of the vehicle. The motor room is a space that houses the electric motor for vehicle traveling. When the refrigeration cycle device 10 is mounted in the hybrid vehicle, the compressor 11 and the condenser 12 are disposed in an engine compartment of the vehicle. The engine compartment is a space that houses the engine.

The condenser 12 includes a condensing portion 12a, a receiver 12b, and a subcooling portion 12c. In the condenser 12, the refrigerant flows through the condensing portion 12a, the receiver 12b, and the subcooling portion 12c, in this order.

The condensing portion 12a exchanges the heat between the high-pressure-side refrigerant discharged from the compressor 11 and the coolant in the high-temperature coolant circuit 20, to condense the high-pressure-side refrigerant.

The receiver 12b is a vapor-liquid separation portion that separates the high-pressure refrigerant flowing out of the condenser 12 into vapor and liquid and causes the separated liquid-phase refrigerant to flow out to the downstream side, and that stores a surplus refrigerant in the cycle.

The subcooling portion 12c exchanges heat between the liquid-phase refrigerant flowing out of the receiver 12b and the coolant in the high-temperature coolant circuit 20, to subcool the liquid-phase refrigerant.

The coolant in the high-temperature coolant circuit 20 is a fluid that serves as a heat medium. The coolant in the high-temperature coolant circuit 20 is a high-temperature heat medium. In the present embodiment, a liquid containing at least ethylene glycol, dimethylpolysiloxane, or a nanofluid, or an antifreezing fluid is used as the coolant in the high-temperature coolant circuit 20. The high-temperature coolant circuit 20 is a first circulation circuit that allows the coolant to circulate therethrough. The high-temperature coolant circuit 20 is a high-temperature heat medium circuit that allows the high-temperature heat medium to circulate therethrough.

The first expansion valve 13 is a first decompression unit that decompresses and expands the liquid-phase refrigerant flowing out of the subcooling portion 12c. The first expansion valve 13 is an electric expansion valve. The electric expansion valve is an electric variable throttle mechanism including a valve element configured such that a throttle opening degree is variable and an electric actuator configured to vary the opening degree of the valve element.

The first expansion valve 13 is a refrigerant flow switching unit that switches between a state in which the refrigerant flows to the air-side evaporator 14 and a state in which the refrigerant does not flow to the air-side evaporator 14. Operation of the first expansion valve 13 is controlled by a control signal output from the controller 60.

The first expansion valve 13 may be a mechanical temperature expansion valve. When the first expansion valve 13 is a mechanical temperature expansion valve, an on-off valve needs to be provided separately from the first expansion valve 13. The on-off valve opens and closes a refrigerant flow path on the side of the first expansion valve 13.

The air-side evaporator 14 is an evaporator that exchanges heat between the refrigerant flowing out of the first expansion valve 13 and air to be blown into the cabin, to evaporate the refrigerant. In the air-side evaporator 14, the refrigerant absorbs heat from the air to be blown into the cabin. The air-side evaporator 14 is an air cooler that cools the air to be blown into the cabin.

The constant-pressure valve 15 is a pressure regulation unit that maintains the pressure of a refrigerant on the outlet side of the air-side evaporator 14 at a predetermined value. The constant-pressure valve 15 is formed of a mechanical variable throttle mechanism. Specifically, the constant-pressure valve 15 reduces the passage area (that is, the throttle opening degree) of a refrigerant passage, when the pressure of the refrigerant on the outlet side of the air-side evaporator 14 falls below a predetermined value. The constant-pressure valve 15 increases the passage area (that is, the throttle opening degree) of the refrigerant passage, when the pressure of the refrigerant on the outlet side of the air-side evaporator 14 exceeds the predetermined value. The vapor-phase refrigerant with its pressure regulated through the constant-pressure valve 15 is sucked into the compressor 11 and compressed.

A fixed throttle may be used which includes an orifice and a capillary tube, instead of using the constant-pressure valve 15, for example, when variation is small in the flow rate of the circulating refrigerant circulating in the cycle.

The second expansion valve 16 is a second decompression unit that decompresses and expands the liquid-phase refrigerant flowing out of the condenser 12. The second expansion valve 16 is an electric expansion valve. The electric expansion valve is an electric variable throttle mechanism including a valve element configured such that a throttle opening degree is variable and an electric actuator configured to vary the opening degree of the valve element. The second expansion valve 16 can fully close a refrigerant flow path.

The second expansion valve 16 is a refrigerant flow switching unit that switches between a state in which the refrigerant flows to the coolant-side evaporator 17 and a state in which the refrigerant does not flow to the coolant-side evaporator 17. Operation of the second expansion valve 16 is controlled by a control signal output from the controller 60.

The second expansion valve 16 may be a mechanical temperature expansion valve. When the second expansion valve 16 is a mechanical temperature expansion valve, an on-off valve needs to be provided separately from the second expansion valve 16. The on-off valve opens and closes a refrigerant flow path on the side of the second expansion valve 16.

The coolant-side evaporator 17 is an evaporation unit that exchanges heat between the refrigerant flowing out of the second expansion valve 16 and a coolant in a low-temperature coolant circuit 30, to evaporate the refrigerant. In the coolant-side evaporator 17, the refrigerant absorbs heat from the coolant in the low-temperature coolant circuit 30. The coolant-side evaporator 17 is a heat medium cooler that cools the coolant in the low-temperature coolant circuit 30. The vapor-phase refrigerant evaporated through the coolant-side evaporator 17 is sucked into the compressor 11 and compressed.

The coolant in the low-temperature coolant circuit 30 is a fluid that serves as a heat medium. The coolant in the low-temperature coolant circuit 30 is a low-temperature heat medium. In the present embodiment, a liquid containing at least ethylene glycol, dimethylpolysiloxane, or a nanofluid, or an antifreezing fluid is used as the coolant in the low-temperature coolant circuit 30. The low-temperature coolant circuit 30 is a low-temperature heat medium circuit that allows the low-temperature heat medium to circulate therethrough. The low-temperature coolant circuit 30 is a second circulation circuit that allows the coolant to circulate therethrough.

In the high-temperature coolant circuit 20, the condenser 12, a high-temperature-side pump 21, a heater core 22, a common radiator 45, a reserve tank 24, and an electric heater 25 are disposed.

The high-temperature-side pump 21 is a heat medium pump that sucks and discharges the coolant. The high-temperature-side pump 21 is an electric pump. The high-temperature-side pump 21 is an electric pump whose discharge flow rate is constant. However, the high-temperature-side pump 21 may be an electric pump whose discharge flow rate is variable.

The heater core 22 is an air heating unit that exchanges heat between the coolant in the high-temperature coolant circuit 20 and the air to be blown into the cabin, to heat the air to be blown into the cabin. In the heater core 22, the coolant releases heat to the air to be blown into the cabin. The heater core 22 is a heat utilizing unit that utilizes heat of the coolant heated through the condenser 12. The high-temperature coolant circuit 20 is a heating circuit that causes the coolant to circulate to the heater core 22.

The common radiator 45 exchanges heat between the coolant in the high-temperature coolant circuit 20 and outside air, to cause the coolant to release heat to the outside air. The common radiator 45 is common to the high-temperature coolant circuit 20 and the low-temperature coolant circuit 30.

The condenser 12 and the high-temperature-side pump 21 are disposed in a condenser flow path 20a. The condenser flow path 20a is a flow path that allows the coolant in the high-temperature coolant circuit 20 to flow therethrough.

The flow direction of the coolant in the condenser 12 is opposite to the flow direction of the refrigerant in the condenser 12. That is, the coolant flows from the subcooling portion 12c to the condensing portion 12a in this order, in the condenser 12.

The heater core 22 is disposed in a heater core flow path 20b. The heater core flow path 20b is a flow path that allows the coolant in the high-temperature coolant circuit 20 to flow therethrough.

The common radiator 45 is disposed in a radiator flow path 20c. The radiator flow path 20c is a flow path that allows the coolant in the high-temperature coolant circuit 20 to flow therethrough in parallel with the heater core 22.

A first three-way valve 26 is disposed in a branching part 20d in the high-temperature coolant circuit 20. The branching part 20d is a branching part from which the condenser flow path 20a branches into the heater core flow path 20b and the radiator flow path 20c.

The first three-way valve 26 is a flow path switching unit that switches the flow path of the coolant in high-temperature coolant circuit 20. The first three-way valve 26 opens and closes the heater core flow path 20b and the radiator flow path 20c. The first three-way valve 26 adjusts an opening degree for the heater core flow path 20b and an opening degree for the radiator flow path 20c. The first three-way valve 26 adjusts a ratio between the opening degree for the heater core flow path 20b and the opening degree for the radiator flow path 20c. The first three-way valve 26 adjusts a ratio between a flow rate of the coolant flowing through the heater core 22 and a flow rate of the coolant flowing through the common radiator 45.

The reserve tank 24 is disposed at a merging part 20e in the high-temperature coolant circuit 20. The merging part 20e is a merging part at which the heater core flow path 20b and the radiator flow path 20c merge into the condenser flow path 20a.

The reserve tank 24 is a storage part that stores a surplus coolant. A decrease in the liquid amount of the coolant circulating through each flow path can be reduced by storing the surplus coolant in the reserve tank 24.

The reserve tank 24 is a closed-type reserve tank or an atmospheric-open-type reserve tank. The closed-type reserve tank is a reserve tank that brings a pressure at the liquid level of the stored coolant to a predetermined pressure. The atmospheric-open-type reserve tank is a reserve tank that brings a pressure at the liquid level of the stored coolant to the atmospheric pressure.

The reserve tank 24 has a vapor-liquid separation function with which air bubbles mixed in the coolant are separated from the coolant.

The electric heater 25 is disposed at a location that is on the downstream side of the branching part 20d and that is on the upstream side of the heater core 22, in the high-temperature coolant circuit 20. The electric heater 25 is a heat source device that generates Joule heat using power supplied from a battery, to heat the coolant. The electric heater 25 is a second heat source. The electric heater 25 supplementally heats the coolant in high-temperature coolant circuit 20. The electric heater 25 is controlled by the controller 60.

In the low-temperature coolant circuit 30, a low-temperature-side pump 31, the coolant-side evaporator 17, and the common radiator 45 are disposed.

The low-temperature-side pump 31 is a heat medium pump that sucks and discharges the coolant. The low-temperature-side pump 31 is an electric pump. The common radiator 45 is an outside-air heat absorption unit that exchanges heat between the coolant in the low-temperature coolant circuit 30 and the outside air, to cause the coolant in the low-temperature coolant circuit 30 to absorb heat from the outside air.

The low-temperature coolant circuit 30 has a portion that merges with the radiator flow path 20c in the high-temperature coolant circuit 20. The common radiator 45 is disposed in the portion in the low-temperature coolant circuit 30 that merges with the radiator flow path 20c in the high-temperature coolant circuit 20. The common radiator 45 thus allows both the coolant in the radiator flow path 20c in the high-temperature coolant circuit 20 and the coolant in the low-temperature coolant circuit 30 to flow through the common radiator 45.

The common radiator 45 and an outdoor blower 40 are disposed in the foremost part of the vehicle. The common radiator 45 can thus receive a traveling wind during traveling of the vehicle.

The outdoor blower 40 is an outside-air blowing unit that blows the outside air toward the common radiator 45. The outdoor blower 40 is an electric blower in which a fan is driven by an electric motor. The operation of the outdoor blower 40 is controlled by the controller 60.

The common radiator 45 and the outdoor blower 40 are disposed in the foremost part of the vehicle. The common radiator 45 can thus receive the traveling wind during the traveling of the vehicle.

The air-side evaporator 14 and the heater core 22 are housed in an air-conditioning casing 51 of a cabin air-conditioning unit 50. The cabin air-conditioning unit 50 is disposed inside an instrument panel (not illustrated) located in the front part of the cabin. The air-conditioning casing 51 is an air passage formation member that forms an air passage.

The heater core 22 is disposed on the air flow downstream side of the air-side evaporator 14, in the air passage inside the air-conditioning casing 51. An inside-air/outside-air switching box 52 and an indoor blower 53 are disposed in the air-conditioning casing 51.

The inside-air/outside-air switching box 52 is an inside-air/outside-air switching portion that introduces inside air and outside air into the air passage inside the air-conditioning casing 51 in a switching manner. The indoor blower 53 sucks and blows the inside air and the outside air introduced into the air passage inside the air-conditioning casing 51 through the inside-air/outside-air switching box 52. The operation of the indoor blower 53 is controlled by the controller 60.

An air-mix door 54 is disposed between the air-side evaporator 14 and the heater core 22 in the air passage inside the air-conditioning casing 51. The air-mix door 54 adjusts an air volume ratio between part of cool air flowing into the heater core 22 and part of cool air flowing through a cool-air bypass passage 55 of cool air having passed through the air-side evaporator 14.

The cool-air bypass passage 55 is an air passage through which the cool air having passed through the air-side evaporator 14 flows to bypass the heater core 22.

The air-mix door 54 is a rotary door including a rotary shaft rotatably supported with respect to the air-conditioning casing 51 and a door base coupled to the rotary shaft. Adjustment of the opening position of the air-mix door 54 allows the temperature of air-conditioning air to be blown into the cabin from the air-conditioning casing 51 to be adjusted to a desired temperature.

The rotary shaft of the air-mix door 54 is driven by a servomotor 56. The operation of the air-mix door servomotor 56 is controlled by the controller 60.

The air-mix door 54 may be a sliding door that slides in a direction substantially orthogonal to the air flow. The sliding door may be a plate-shaped door formed of a rigid body. Alternatively, the sliding door may be a film door formed of a film material having flexibility.

The air-conditioning air whose temperature has been adjusted by the air-mix door 54 is blown into the cabin from an air outlet 57 formed in the air-conditioning casing 51.

In a heat storage circuit 80, a heat storage pump 81, a waste-heat generating device 82, the common radiator 45, and a second three-way valve 83 are disposed.

A coolant in the heat storage circuit 80 is a fluid that serves as a heat medium. The coolant in the heat storage circuit 80 is a high-temperature heat medium. In the present embodiment, a liquid containing at least ethylene glycol, dimethylpolysiloxane, or a nanofluid, or an antifreezing fluid is used as the coolant in the heat storage circuit 80. The heat storage circuit 80 is a high-temperature heat medium circuit that allows the high-temperature heat medium to circulate therethrough.

The heat storage pump 81 is a heat medium pump that sucks and discharges the coolant. The heat storage pump 81 is an electric pump.

The waste-heat generating device 82 is a heat source device that generates waste heat along with its operation. The waste-heat generating device 82 is a first heat source. For example, the waste-heat generating device 82 is an inverter. The waste-heat generating device 82 may be a motor-generator, a charger, or the like. The heat storage pump 81 and the waste-heat generating device 82 are disposed in a waste-heat generating device flow path 80a.

The common radiator 45 is disposed in a defrosting flow path 80b. The defrosting flow path 80b is a flow path that allows the coolant in the heat storage circuit 80 to flow therethrough. A circulation flow path 80c is a flow path that allows the coolant in the heat storage circuit 80 to flow therethrough in parallel with the defrosting flow path 80b.

The defrosting flow path 80b has a portion that merges with the radiator flow path 20c in the high-temperature coolant circuit 20 and the low-temperature coolant circuit 30. The common radiator 45 is disposed in the portion in the defrosting flow path 80b that merges with the radiator flow path 20c in the high-temperature coolant circuit 20 and the low-temperature coolant circuit 30. The common radiator 45 thus allows the coolant in the radiator flow path 20c in the high-temperature coolant circuit 20, the coolant in the low-temperature coolant circuit 30, and the coolant in the defrosting flow path 80b in the heat storage circuit 80 to flow through the common radiator 45.

The second three-way valve 83 is disposed in a branching part 80d in the heat storage circuit 80. The branching part 80d is a branching part from which the waste-heat generating device flow path 80a branches into the defrosting flow path 80b and the circulation flow path 80c. The defrosting flow path 80b and the circulation flow path 80c merge into the waste-heat generating device flow path 80a, at a merging part 80e.

The second three-way valve 83 is a flow path switching unit that switches the flow path of the coolant in the heat storage circuit 80. The second three-way valve 83 opens and closes the defrosting flow path 80b and the circulation flow path 80c. The second three-way valve 83 adjusts an opening degree for the defrosting flow path 80b and an opening degree for the circulation flow path 80c. The second three-way valve 83 adjusts a ratio between the opening degree for the defrosting flow path 80b and the opening degree for the circulation flow path 80c. The second three-way valve 83 adjusts a ratio between a flow rate of the coolant flowing through the defrosting flow path 80b and a flow rate of the coolant flowing through the circulation flow path 80c.

Figure 2:
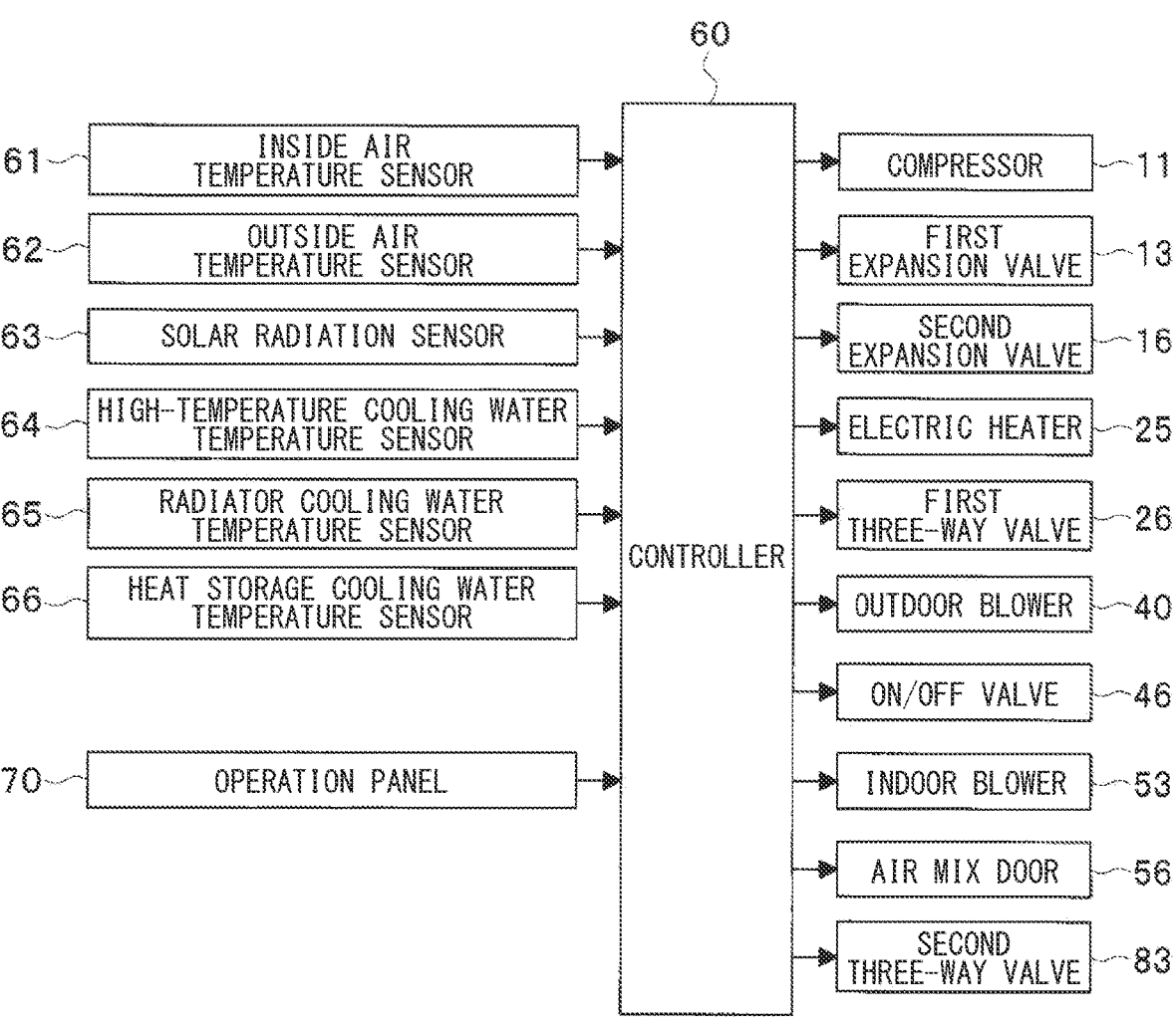
FIG. 2 is a block diagram illustrating a controller of the refrigeration cycle device in the first embodiment.

The controller 60 illustrated in FIG. 2 includes a known microcomputer including a central processing unit (CPU), a read-only memory (ROM), and a random access memory (RAM), and a peripheral circuit thereof. The controller 60 performs various computations and processing based on a control program stored in the ROM. Various control target devices are connected to the output side of the controller 60. The controller 60 is a controller that controls operations of the various control target devices.

The control target devices controlled by the controller 60 include the compressor 11, the first expansion valve 13, the second expansion valve 16, the first three-way valve 26, the outdoor blower 40, the indoor blower 53, the air-mix door servomotor 56, and the second three-way valve 83.

Software and hardware for controlling the electric motor of the compressor 11 in the controller 60 form a refrigerant discharge capacity controller. Software and hardware for controlling the first expansion valve 13 and the second expansion valve 16 in the controller 60 form a throttle controller.

Software and hardware for controlling the first three-way valve 26 and the second three-way valve 83 in the controller 60 form a three-way valve controller. Each of the controller 60, the first three-way valve 26, and the second three-way valve 83 is a flow path switching unit that switches the flow path of the coolant.

Software and hardware for controlling the outdoor blower 40 in the controller 60 form an outside-air blowing capacity controller.

Software and hardware for controlling the indoor blower 53 in the controller 60 form an air blowing capacity controller.

Software and hardware for controlling the air-mix door servomotor 56 in the controller 60 form an air volume ratio controller.

A group of various sensors for control is connected to the input side of the controller 60. The group of various sensors for control includes an inside-air temperature sensor 61, an outside-air temperature sensor 62, a solar radiation sensor 63, a high-temperature cooling water temperature sensor 64, a radiator temperature sensor 65, and a heat storage cooling water temperature sensor 66.

The inside-air temperature sensor 61 detects a temperature Tr in the cabin. The outside-air temperature sensor 62 detects an outside-air temperature Tam. The solar radiation sensor 63 detects a solar radiation amount Ts in the cabin.

The high-temperature cooling water temperature sensor 64 detects a temperature TWH of the coolant in the high-temperature coolant circuit 20. For example, the high-temperature cooling water temperature sensor 64 detects a temperature of the coolant flowing out of the electric heater 25.

The radiator temperature sensor 65 detects a temperature TWR of the coolant flowing into the common radiator 45. The heat storage cooling water temperature sensor 66 detects a temperature TWW of the coolant in the heat storage circuit 80. For example, the heat storage cooling water temperature sensor 66 detects a temperature of the coolant flowing out of the waste-heat generating device 82.

Various operation switches (not illustrated) are connected to the input side of the controller 60. The various operation switches are provided on an operation panel 70, and are operated by an occupant. The operation panel 70 is disposed in the vicinity of the instrument panel in the front part of the cabin. The controller 60 receives input of operation signals from the various operation switches.

The various operation switches include an automatic switch, an air-conditioning switch, and a temperature setting switch. The automatic switch is a switch that sets and cancels automatic control operation of the vehicular air-conditioning system 1. The air-conditioning switch is a switch that sets whether cooling of the air is performed in the cabin air-conditioning unit 50. The temperature setting switch is a switch that sets a set temperature in the cabin.

Next, operation with the above configuration will be described. Hereinafter, description will be given for operation of the controller 60 when the automatic switch of the operation panel 70 is turned on by the occupant. When the air-conditioning switch of the operation panel 70 is turned on by the occupant, operation mode is switched, based on a target outlet air temperature TAO and the like, and a control map illustrated in FIG. 3. The operation mode includes at least a cooling mode and a dehumidifying and heating mode.

The target outlet air temperature TAO is a target temperature of the blown air to be blown into the cabin. The controller 60 calculates the target outlet air temperature TAO based on the following equation.

$$TAO = Kset \times Tset - Kr \times Tr - Kam \times Tam - Ks \times Ts + C$$

In this equation, Tset is the set temperature in the cabin set by the temperature setting switch of the operation panel 70, Tr is the inside-air temperature detected by the inside-air temperature sensor 61, Tam is the outside-air temperature detected by the outside-air temperature sensor 62, and Ts is the solar radiation amount detected by the solar radiation sensor 63. Kset, Kr, Kam, and Ks are control gains, and C is a constant for correction.

The mode is switched to the cooling mode, in a low-temperature range of the target outlet air temperature TAO. The mode is switched to the dehumidifying and heating mode, in a high-temperature range of the target outlet air temperature TAO.

In the dehumidifying and heating mode, dehumidifying and heating of air in the cabin is performed by cooling and dehumidifying the air to be blown into the cabin in the air-side evaporator 14, and by then heating the air cooled and dehumidified in the air-side evaporator 14, in the heater core 22.

When the air-conditioning switch of the operation panel 70 is turned off by the occupant and the target outlet air temperature TAO is within the high-temperature range, the controller 60 switches the mode to a heating mode.

In the heating mode, heating of the air in the cabin is performed by heating the air to be blown into the cabin in the heater core 22 without cooling and dehumidifying the air to be blown into the cabin in the air-side evaporator 14.

Next, operation in the cooling mode, operation in the dehumidifying and heating mode, and operation in the heating mode will be described. In the cooling mode, the dehumidifying and heating mode, and the heating mode, the controller 60 determines operation states of the various control target devices connected to the controller 60 (that is, control signals output to the various control target devices), based on the target outlet air temperature TAO, detection signals from the sensor group described above, and the like.

(1) Cooling Mode

In the cooling mode, the controller 60 operates the compressor 11, the high-temperature-side pump 21, and the heat storage pump 81, while the controller 60 stops the low-temperature-side pump 31. In the cooling mode, the controller 60 opens the first expansion valve 13 at the throttle opening degree, while the controller 60 closes the second expansion valve 16. In the cooling mode, the controller 60 controls the first three-way valve 26 to open both the heater core flow path 20*b* and the radiator flow path 20*c*, while the controller 60 controls the second three-way valve 83 to close the defrosting flow path 80*b* and to open the circulation flow path 80*c*.

As a result, in the refrigeration cycle device 10 in the cooling mode, the refrigerant flows in the following manner. That is, the high-pressure refrigerant discharged from the compressor 11 flows into the condenser 12. The refrigerant flowing into the condenser 12 releases heat to the coolant in the high-temperature coolant circuit 20. As a result, the refrigerant is cooled and condensed in the condenser 12.

The refrigerant flowing out of the condenser 12 flows into the first expansion valve 13, and is decompressed and expanded in the first expansion valve 13 until the refrigerant becomes a low-pressure refrigerant. The low-pressure refrigerant decompressed in the first expansion valve 13 flows into the air-side evaporator 14, and absorbs heat from the air to be blown into the cabin to evaporate. As a result, the air to be blown into the cabin is cooled.

The refrigerant flowing out of the air-side evaporator 14 flows to the suction side of the compressor 11, and is compressed again in the compressor 11.

As described above, the cooling mode can cause the low-pressure refrigerant to absorb heat from the air in the air-side evaporator 14, to cause the cooled air to be blown into the cabin. As a result, cooling of the air in the cabin can be achieved.

In the high-temperature coolant circuit 20 in the cooling mode, the coolant in the high-temperature coolant circuit 20 circulates through the common radiator 45, and releases heat to the outside air in the common radiator 45.

At this time, the coolant in the high-temperature coolant circuit 20 also circulates through the heater core 22, and an amount of heat released from the coolant to the air in the heater core 22 is adjusted by the air-mix door 54.

A control signal output to the servomotor of the air-mix door 54 is determined such that the air-conditioning air whose temperature has been adjusted by the air-mix door 54 has the target outlet air temperature TAO. Specifically, the opening degree of the air-mix door 54 is determined based on the target outlet air temperature TAO, the temperature of the air-side evaporator 14, the temperature TW of the coolant in the high-temperature coolant circuit 20, and the like.

In the heat storage circuit 80 in the cooling mode, the coolant circulates through the waste-heat generating device 82, and the coolant stores the waste heat of the waste-heat generating device 82.

(2) Dehumidifying and Heating Mode

In the dehumidifying and heating mode, the controller 60 operates the compressor 11, the high-temperature-side pump 21, the low-temperature-side pump 31, and the heat storage pump 81. In the dehumidifying and heating mode, the controller 60 opens the first expansion valve 13 and the second expansion valve 16 at the respective throttle opening degrees. In the dehumidifying and heating mode, the controller 60 controls the first three-way valve 26 to open the heater core flow path 20*b* and to close the radiator flow path 20*c*, while the controller 60 controls the second three-way valve 83 to close the defrosting flow path 80*b* and to open the circulation flow path 80*c*.

In the refrigeration cycle device 10 in the dehumidifying and heating mode, the refrigerant flows in the following manner. That is, in the refrigeration cycle device 10, the high-pressure refrigerant discharged from the compressor 11 flows into the condenser 12, and exchanges heat with the coolant in the high-temperature coolant circuit 20 to release heat. As a result, the coolant in the high-temperature coolant circuit 20 is heated.

The refrigerant flowing out of the condenser 12 flows into the first expansion valve 13, and is decompressed and expanded in the first expansion valve 13 until the refrigerant becomes a low-pressure refrigerant. The low-pressure refrigerant decompressed in the first expansion valve 13 flows into the air-side evaporator 14, and absorbs heat from the air to be blown into the cabin to evaporate. As a result, the air to be blown into the cabin is cooled and dehumidified.

The refrigerant flowing out of the air-side evaporator 14 flows to the suction side of the compressor 11, and is compressed again in the compressor 11.

At the same time, in the refrigeration cycle device 10, the refrigerant flowing out of the condenser 12 flows into the second expansion valve 16, and is decompressed and expanded in the second expansion valve 16 until the refrigerant becomes a low-pressure refrigerant. The low-pressure refrigerant decompressed in the second expansion valve 16 flows into the coolant-side evaporator 17, and absorbs heat from the coolant in the low-temperature coolant circuit 30 to evaporate. As a result, the coolant in the low-temperature coolant circuit 30 is cooled.

The refrigerant flowing out of the coolant-side evaporator 17 flows to the suction side of the compressor 11, and is compressed again in the compressor 11.

In the high-temperature coolant circuit 20 in the dehumidifying and heating mode, the coolant circulates between the condenser 12 and the heater core 22, but the coolant does not circulate through the common radiator 45.

The control signal output to the servomotor of the air-mix door 54 is determined such that the air-mix door 54 fully opens the air passage for the heater core 22 to allow the total flow rate of the blown air having passed through the air-side evaporator 14 to pass through the heater core 22.

As a result, heat is released from the coolant in the high-temperature coolant circuit 20 to the air to be blown into the cabin, in the heater core 22. The air cooled and dehumidified in the air-side evaporator 14 is thus heated in the heater core 22 and blown into the cabin.

At this time, the first three-way valve 26 closes the radiator flow path 20c, and thus the coolant in the high-temperature coolant circuit 20 does not circulate through the common radiator 45. Heat is therefore not released from the coolant to the outside air in the common radiator 45.

In the low-temperature coolant circuit 30 in the dehumidifying and heating mode, the coolant in the low-temperature coolant circuit 30 circulates through the common radiator 45. The coolant in the low-temperature coolant circuit 30 thus absorbs heat from the outside air in the common radiator 45.

As described above, the dehumidifying and heating mode can cause the high-pressure refrigerant discharged from the compressor 11 to release the heat to the coolant in the high-temperature coolant circuit 20 in the condenser 12, and cause the coolant in the high-temperature coolant circuit 20 to release the heat to the air in the heater core 22, to cause the air heated in the heater core 22 to be blown into the cabin.

In the heater core 22, the air cooled and dehumidified in the air-side evaporator 14 is heated. As a result, dehumidifying and heating of the air in the cabin can be achieved.

In the heat storage circuit 80 in the dehumidifying and heating mode, the coolant circulates through the waste-heat generating device 82, and the coolant stores the waste heat of the waste-heat generating device 82.

(3) Heating Mode

In the heating mode, the controller 60 operates the compressor 11, the high-temperature-side pump 21, the low-temperature-side pump 31, and the heat storage pump 81. In the heating mode, the controller 60 closes the first expansion valve 13, while the controller 60 opens the second expansion valve 16 at the throttle opening degree. In the heating mode, the controller 60 controls the first three-way valve 26 to open the heater core flow path 20b and to close the radiator flow path 20c, while the controller 60 controls the second three-way valve 83 to close the defrosting flow path 80b and to open the circulation flow path 80c.

In the refrigeration cycle device 10 in the heating mode, the refrigerant flows in the following manner. That is, in the refrigeration cycle device 10, the refrigerant flowing out of the condenser 12 flows into the second expansion valve 16, and is decompressed and expanded in the second expansion valve 16 until the refrigerant becomes a low-pressure refrigerant. The low-pressure refrigerant decompressed in the second expansion valve 16 flows into the coolant-side evaporator 17, and absorbs heat from the coolant in the low-temperature coolant circuit 30 to evaporate. As a result, the coolant in the low-temperature coolant circuit 30 is cooled.

At this time, the first expansion valve 13 is closed, and thus the refrigerant does not flow to the air-side evaporator 14. The air is thus not cooled and dehumidified in the air-side evaporator 14.

In the high-temperature coolant circuit 20 in the heating mode, the coolant circulates between the condenser 12 and the heater core 22, but the coolant does not circulate through the common radiator 45.

The control signal output to the servomotor of the air-mix door 54 is determined such that the air-mix door 54 fully opens the air passage for the heater core 22 to allow the total flow rate of the blown air having passed through the air-side evaporator 14 to pass through the heater core 22.

As a result, heat is released from the coolant in the high-temperature coolant circuit 20 to the air to be blown into the cabin, in the heater core 22. The air having passed through the air-side evaporator 14 (that is, the air without being cooled and dehumidified in the air-side evaporator 14) is thus heated in the heater core 22 and blown into the cabin.

At this time, the first three-way valve 26 closes the radiator flow path 20c, and thus the coolant in the high-temperature coolant circuit 20 does not circulate through the common radiator 45. Heat is therefore not released from the coolant to the outside air in the common radiator 45.

In the low-temperature coolant circuit 30 in the heating mode, the coolant in the low-temperature coolant circuit 30 circulates through the common radiator 45. The coolant in the low-temperature coolant circuit 30 thus absorbs heat from the outside air in the common radiator 45.

As described above, the heating mode can cause the high-pressure refrigerant discharged from the compressor 11 to release the heat to the coolant in the high-temperature coolant circuit 20 in the condenser 12, and cause the coolant in the high-temperature coolant circuit 20 to release the heat to the air in the heater core 22, to cause the air heated in the heater core 22 to be blown into the cabin.

In the heater core 22, the air having passed through the air-side evaporator 14 without being cooled and dehumidified in the air-side evaporator 14 is heated. As a result, heating of the air in the cabin can be achieved.

In the heat storage circuit 80 in the heating mode, the coolant circulates through the waste-heat generating device 82, and the coolant stores the waste heat of the waste-heat generating device 82.

(4) Defrosting Mode

A defrosting mode performs defrosting of the common radiator 45 after the dehumidifying and heating mode is performed or after the heating mode is performed. In the dehumidifying and heating mode or the heating mode, the coolant in the low-temperature coolant circuit 30 absorbs heat from the outside air in the common radiator 45. The common radiator 45 is thus frosted when the temperature of the common radiator 45 becomes below the freezing point. Therefore, when the common radiator 45 is frosted, the defrosting mode is performed to defrost the common radiator 45.

The defrosting mode includes a waste-heat defrosting mode and a heating-heat defrosting mode. In the waste-heat defrosting mode, the common radiator 45 is defrosted using waste heat generated from the waste-heat generating device 82. In the heating-heat defrosting mode, the common radiator 45 is defrosted using heat generated for air heating.

(4-1) Waste-Heat Defrosting Mode

In the waste-heat defrosting mode, the controller 60 operates the heat storage pump 81, while the controller 60 stops the compressor 11, the low-temperature-side pump 31, the outdoor blower 40, and the indoor blower 53. In the dehumidifying and heating mode, the controller 60 controls the first three-way valve 26 to open the heater core flow path 20b and to close the radiator flow path 20c, while the controller 60 controls the second three-way valve 83 to open the defrosting flow path 80b and to close the circulation flow path 80c.

The compressor 11 is stopped, and thus the refrigerant does not flow in the refrigeration cycle device 10 in the defrosting mode. The low-temperature-side pump 31 is stopped, and thus the coolant does not circulate through the low-temperature coolant circuit 30 in the defrosting mode.

Figure 3:
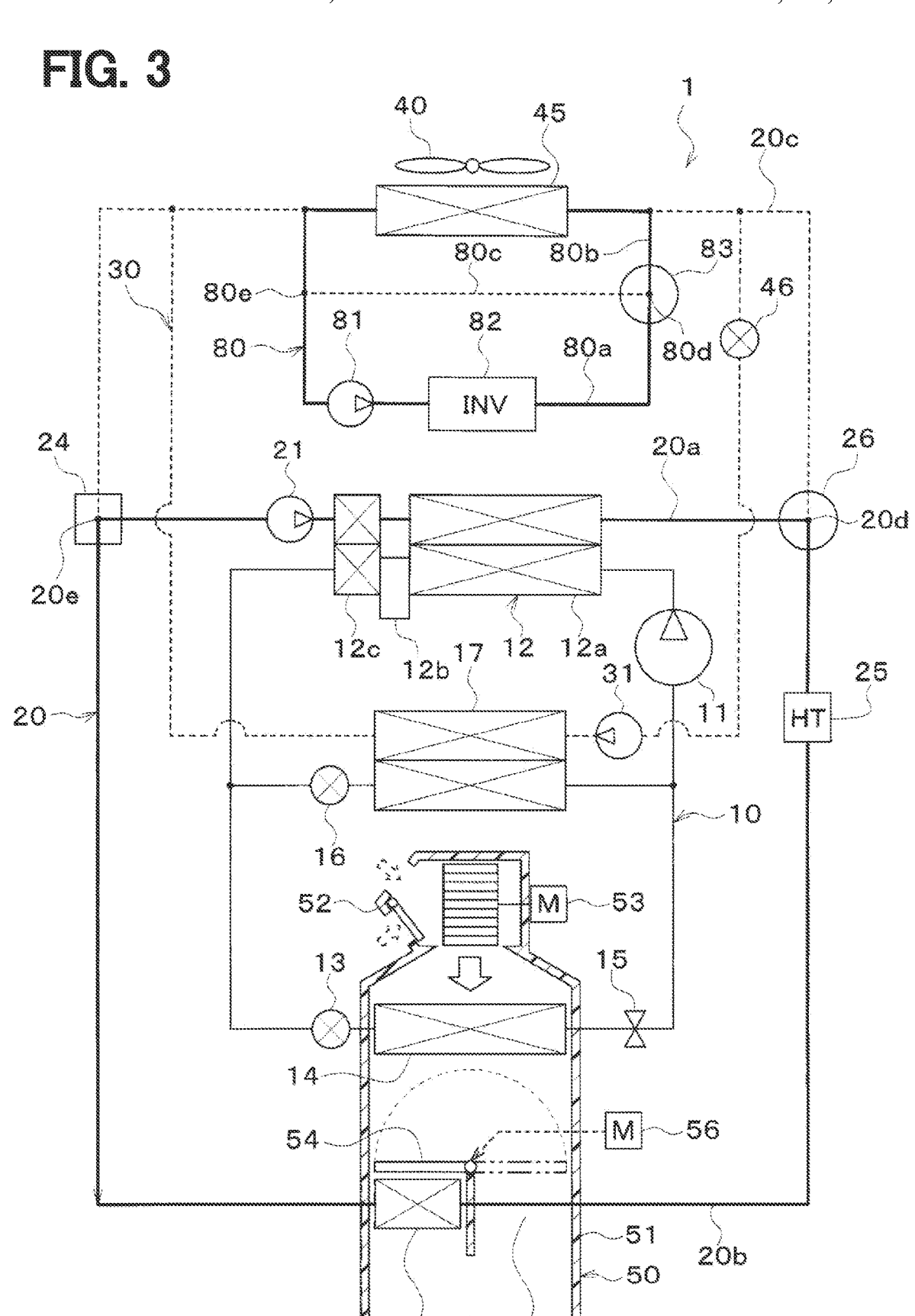
FIG. 3 is an overall configuration diagram illustrating an operation state of the refrigeration cycle device in the first embodiment in a waste-heat defrosting mode.

In the heat storage circuit 80 in the waste-heat defrosting mode, the coolant in the heat storage circuit 80 circulates between the waste-heat generating device 82 and the common radiator 45, as indicated by a thick solid line in FIG. 3.

Specifically, the coolant discharged from the heat storage pump 81 passes through the waste-heat generating device 82 to flow through the common radiator 45, and is sucked into the high-temperature-side pump 21. As a result, the high-temperature coolant heated by the waste-heat generating device 82 flows into the common radiator 45.

The outdoor blower 40 is stopped, and thus the air does not flow to the common radiator 45. In the common radiator 45, the coolant is therefore not cooled by the outside air.

In this manner, the frost adhering to the surface of the common radiator 45 can be melted by the heat of the coolant in the heat storage circuit 80 flowing through the common radiator 45. That is, the waste heat generated from the waste-heat generating device 82 can be effectively used for defrosting.

(4-2) Heating-Heat Defrosting Mode

In the heating-heat defrosting mode, the controller 60 operates the high-temperature-side pump 21 and the heat storage pump 81, while the controller 60 stops the compressor 11, the low-temperature-side pump 31, the outdoor blower 40, and the indoor blower 53. In the dehumidifying and heating mode, the controller 60 controls the first three-way valve 26 to open both the heater core flow path 20b and the radiator flow path 20c, while the controller 60 controls the second three-way valve 83 to close the defrosting flow path 80b and to open the circulation flow path 80c.

The compressor 11 is stopped, and thus the refrigerant does not flow in the refrigeration cycle device 10 in the defrosting mode. The low-temperature-side pump 31 is stopped, and thus the coolant does not circulate through the low-temperature coolant circuit 30 in the defrosting mode.

Figure 4:
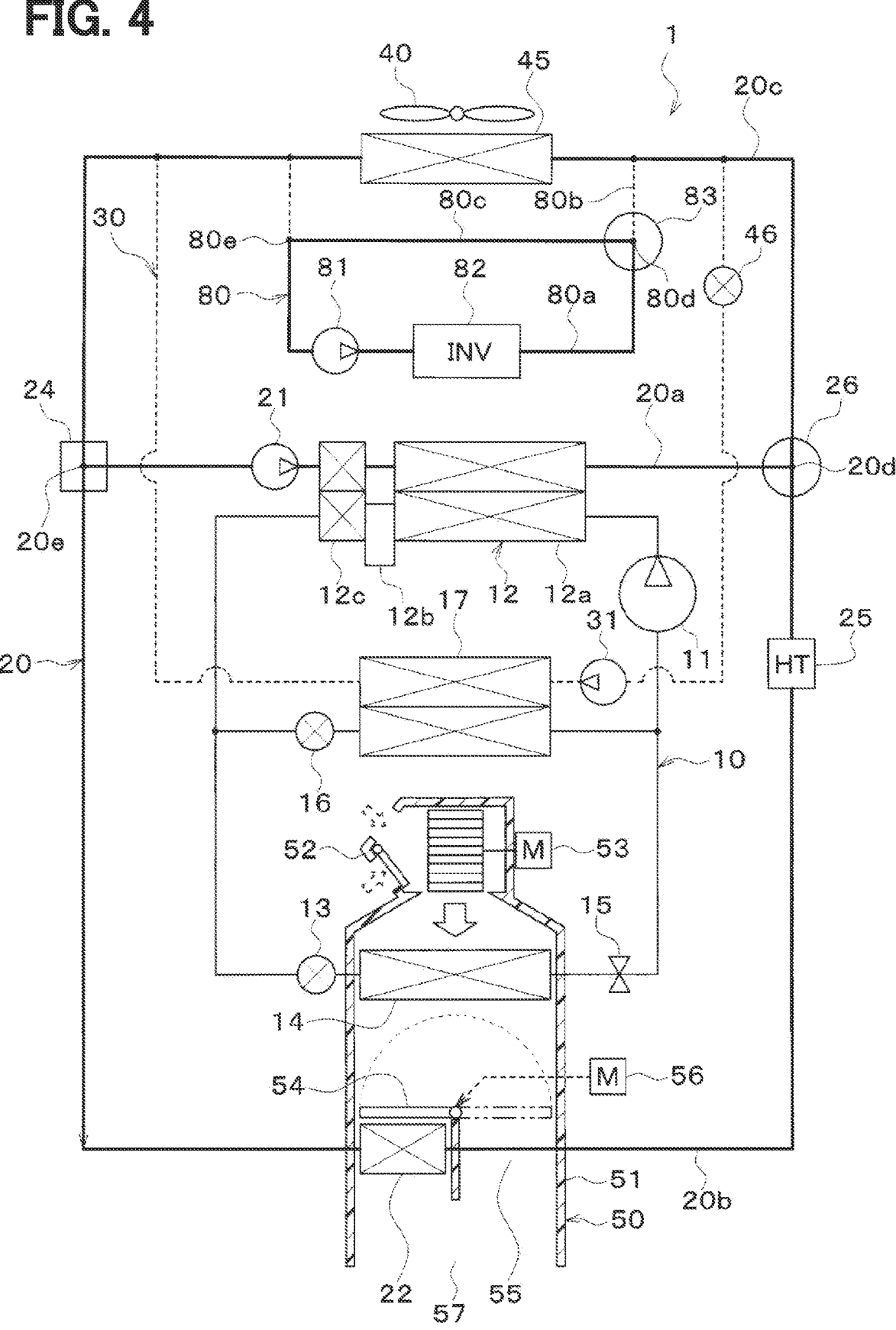
FIG. 4 is an overall configuration diagram illustrating an operation state of the refrigeration cycle device in the first embodiment in a heating-heat defrosting mode.

In the high-temperature coolant circuit 20 in the heating-heat defrosting mode, the coolant in the high-temperature coolant circuit 20 circulates between the condenser 12 and each of the heater core 22, the electric heater 25, and the common radiator 45, as indicated by a thick solid line in FIG. 4.

Specifically, the coolant discharged from the high-temperature-side pump 21 passes through the condenser 12, and the flow of the coolant branches into the flow flowing into the side of the heater core 22 and the flow flowing into the side of the common radiator 45 at the branching part 20d. The coolant then flows in parallel through each of the heater core 22 and the electric heater 25, and the common radiator 45, and the respective flows of the coolant merge at the merging part 20e. The coolant is thereafter sucked into the high-temperature-side pump 21. As a result, the high-temperature coolant flowing through the condenser 12 flows into the common radiator 45.

The indoor blower 53 is stopped, and thus the air does not flow to the heater core 22. The high-temperature coolant flowing through the heater core 22 therefore flows into the common radiator 45 without being cooled by the air.

The outdoor blower 40 is stopped, and thus the air does not flow to the common radiator 45. In the common radiator 45, the coolant is therefore not cooled by the outside air.

In this manner, the frost adhering to the surface of the common radiator 45 can be melted by the heat of the coolant in the high-temperature coolant circuit 20 flowing through the common radiator 45.

The coolant cooled in the common radiator 45 merges with the coolant flowing out of the heater core 22 at the merging part 20e, and then flows into the condenser 12.

The heat of the coolant heated in the condenser 12 can be effectively used for defrosting by causing the coolant to circulate in this manner. When the heat of the coolant heated in the condenser 12 is insufficient for the heat necessary for the defrosting, the heat generated in the electric heater 25 can be used to perform the defrosting.

In the heat storage circuit 80 in the heating-heat defrosting mode, the coolant circulates through the waste-heat generating device 82, and the coolant stores the waste heat of the waste-heat generating device 82, as indicated by a thick solid line in FIG. 4.

Figure 5:
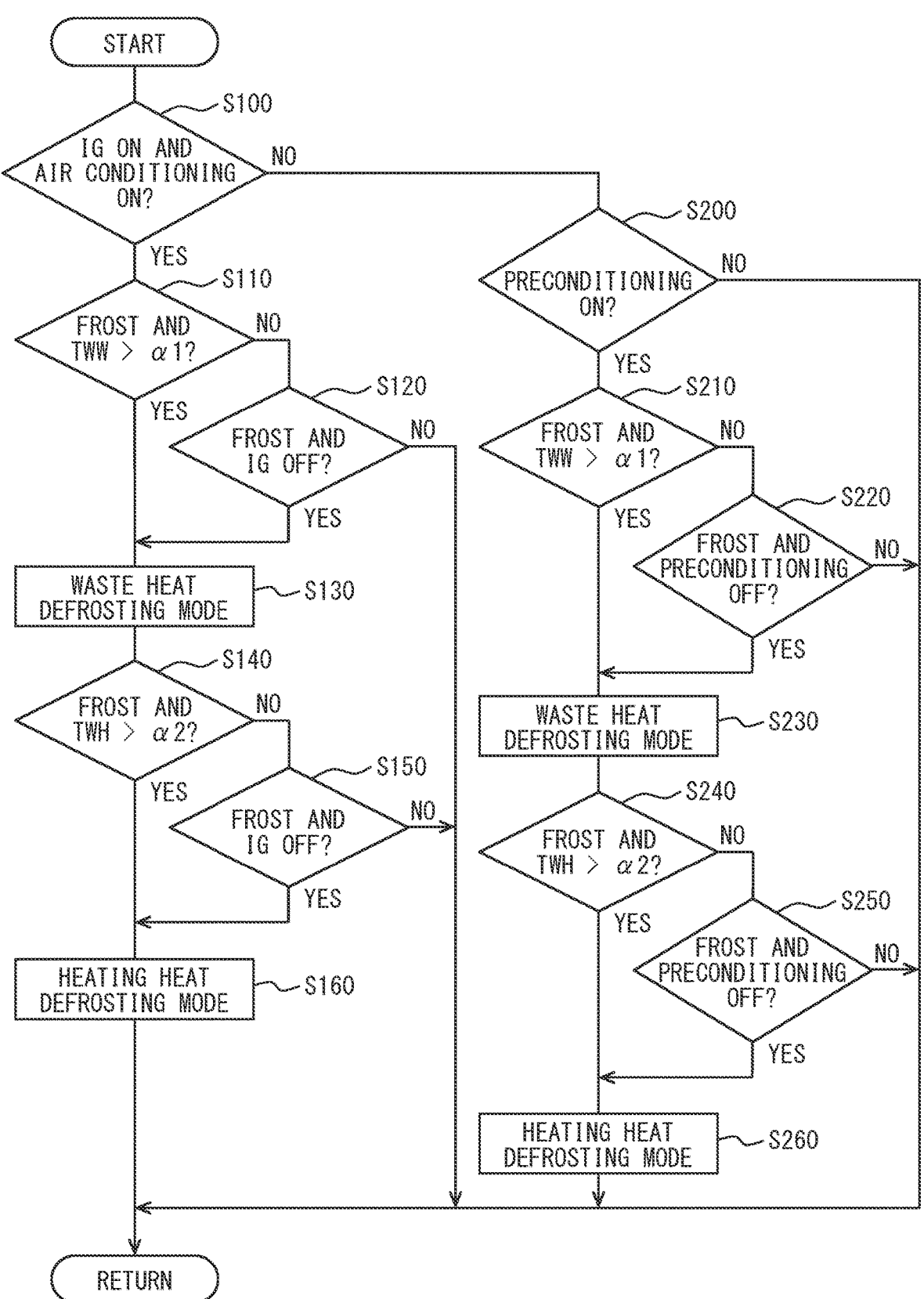
FIG. 5 is a flowchart illustrating control processing performed based on a control program in the first embodiment.

The controller 60 performs switching between the waste-heat defrosting mode and the heating-heat defrosting mode by performing the control processing illustrated in the flowchart of FIG. 5.

In step S100, determination is made whether an ignition switch (that is, an activation switch of a vehicle system) is turned on and air conditioning is turned on. Determination is made that the air conditioning is turned on, for example, when the automatic switch or the air-conditioning switch of the operation panel 70 is turned on.

When determination is made in step S100 that the ignition switch is turned on and the air conditioning is turned on, the processing proceeds to step S110. When determination is not made in step S100 that the ignition switch is turned on and the air conditioning is turned on, the processing proceeds to step S200.

Figure 6:
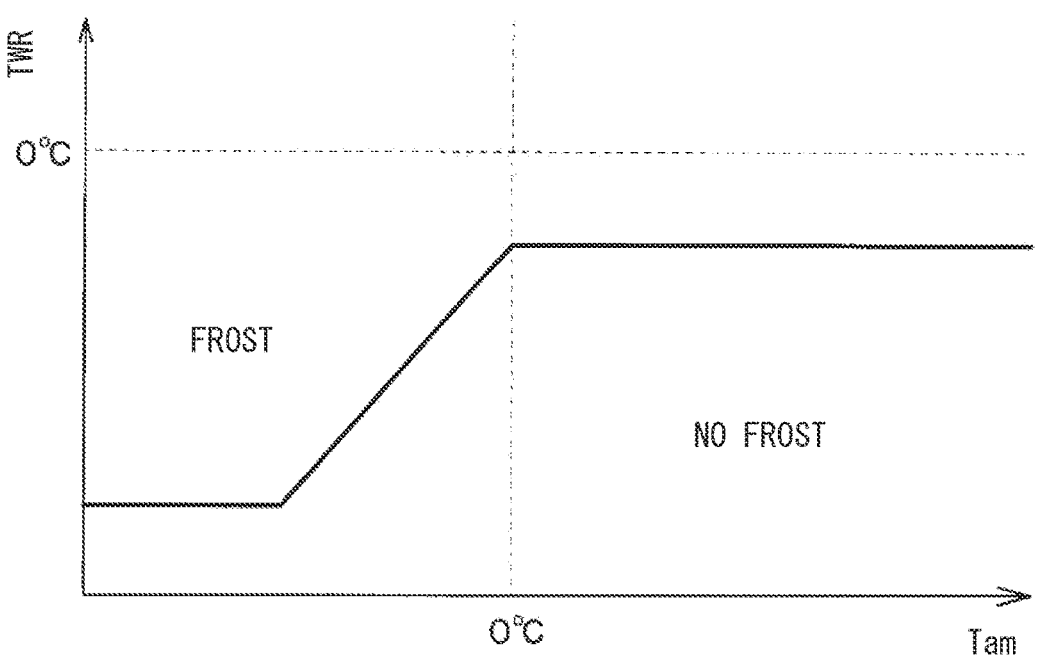
FIG. 6 is a determination diagram used for determination whether a common radiator is frosted in the control processing performed based on the control program in the first embodiment.

In step S110, determination is made whether the common radiator 45 is frosted and the temperature TWW of the coolant in the heat storage circuit 80 is higher than a waste-heat defrosting temperature α1. For example, the determination whether the common radiator 45 is frosted is made based on the temperature TWR of the coolant flowing into the common radiator 45 and the outside-air temperature Tam using the control characteristic diagram illustrated in FIG. 6.

That is, determination is made that the common radiator 45 is frosted when the difference between the outside-air temperature Tam and the temperature TWR of the coolant flowing into the common radiator 45 is large. When the common radiator 45 is frosted, the performance of the common radiator 45 is reduced. The controller 60 thus increases the rotational speed of the compressor 11 to reduce the low pressure of the cycle in order to secure a necessary heat absorption amount. When the low pressure of the cycle is reduced, the temperature of the coolant cooled in the coolant-side evaporator 17 (that is, the temperature TWR of the coolant flowing into the common radiator 45) is reduced. An estimation can be thus made that the common radiator 45 is frosted when the difference between the outside-air temperature Tam and the temperature TWR of the coolant flowing into the common radiator 45 is large.

The waste-heat defrosting temperature al is a temperature (predetermined temperature) of the coolant at which the frost adhering to the surface of the common radiator 45 can be melted, and is stored in advance in the controller 60.

When determination is not made in step S110 that the common radiator 45 is frosted and the temperature TWW of the coolant in the heat storage circuit 80 is higher than the waste-heat defrosting temperature α1, the processing proceeds to step S120. When determination is made in step S110 that the common radiator 45 is frosted and the temperature TWW of the coolant in the heat storage circuit 80 is higher than the waste-heat defrosting temperature α1, the processing proceeds to step S130.

In step S120, determination is made whether the common radiator 45 is frosted and the ignition switch is turned off. When determination is made in step S120 that the common radiator 45 is frosted and the ignition switch is turned off, the processing proceeds to step S130. When determination is not made in step S120 that the common radiator 45 is frosted and the ignition switch is turned off, the processing returns to step S100.

In step S130, the mode is switched to the waste-heat defrosting mode, and the processing proceeds to step S140.

In step S140, determination is made whether the common radiator 45 is frosted and the temperature TWH of the coolant in the high-temperature coolant circuit 20 is higher than a heating-heat defrosting temperature α2. The heating-heat defrosting temperature α2 is a temperature (predetermined temperature) of the coolant at which the frost adhering to the surface of the common radiator 45 can be melted, and is stored in advance in the controller 60.

When determination is not made in step S140 that the common radiator 45 is frosted and the temperature TWH of the coolant in the high-temperature coolant circuit 20 is higher than the heating-heat defrosting temperature α2, the processing proceeds to step S150. When determination is made in step S140 that the common radiator 45 is frosted and the temperature TWH of the coolant in the high-temperature coolant circuit 20 is higher than the heating-heat defrosting temperature α2, the processing proceeds to step S160.

In step S150, determination is made whether the common radiator 45 is frosted and the ignition switch is turned off. When determination is made in step S150 that the common radiator 45 is frosted and the ignition switch is turned off, the processing proceeds to step S160. When determination is not made in step S150 that the common radiator 45 is frosted and the ignition switch is turned off, the processing returns to step S100. In step S160, the mode is switched to the heating-heat defrosting mode, and the processing returns to step S100.

In step S200, determination is made whether pre-air conditioning is turned on. The pre-air conditioning is an air-conditioning operation started before the occupant gets in the vehicle (that is, when the ignition switch is turned off). The pre-air conditioning is performed by operation of the occupant that causes the controller 60 to store the target temperature Tset in the cabin, the time of starting the pre-air conditioning, and the like, using the operation panel 70 or a remote control terminal.

When determination is made in step S200 that the pre-air conditioning is turned on, the processing proceeds to step S210. When determination is not made in step S200 that the pre-air conditioning is turned on, the processing returns to step S100.

In step S210, determination is made whether the common radiator 45 is frosted and the temperature TWW of the coolant in the heat storage circuit 80 is higher than the waste-heat defrosting temperature α1. For example, the determination whether the common radiator 45 is frosted is made by comparing the temperature TWR of the coolant flowing into the common radiator 45 and the outside-air temperature Tam.

When determination is not made in step S210 that the common radiator 45 is frosted and the temperature TWW of the coolant in the heat storage circuit 80 is higher than the waste-heat defrosting temperature α1, the processing proceeds to step S220. When determination is made in step S210 that the common radiator 45 is frosted and the temperature TWW of the coolant in the heat storage circuit 80 is higher than the waste-heat defrosting temperature α1, the processing proceeds to step S230.

In step S220, determination is made whether the common radiator 45 is frosted and the pre-air conditioning is turned off. When determination is made in step S220 that the common radiator 45 is frosted and the pre-air conditioning is turned off, the processing proceeds to step S230. When determination is not made in step S220 that the common radiator 45 is frosted and the pre-air conditioning is turned off, the processing returns to step S100.

In step S230, the mode is switched to the waste-heat defrosting mode, and the processing proceeds to step S240.

In step S240, determination is made whether the common radiator 45 is frosted and the temperature TWH of the coolant in the high-temperature coolant circuit 20 is higher than the heating-heat defrosting temperature α2.

When determination is not made in step S240 that the common radiator 45 is frosted and the temperature TWH of the coolant in the high-temperature coolant circuit 20 is higher than the heating-heat defrosting temperature α2, the processing proceeds to step S250. When determination is made in step S240 that the common radiator 45 is frosted and the temperature TWH of the coolant in the high-temperature coolant circuit 20 is higher than the heating-heat defrosting temperature α2, the processing proceeds to step S260.

In step S250, determination is made whether the common radiator 45 is frosted and the pre-air conditioning is turned off. When determination is made in step S250 that the common radiator 45 is frosted and the pre-air conditioning is turned off, the processing proceeds to step S260. When determination is not made in step S250 that the common radiator 45 is frosted and the pre-air conditioning is turned off, the processing returns to step S100. In step S260, the mode is switched to the heating-heat defrosting mode, and the processing returns to step S100.

Figure 7:
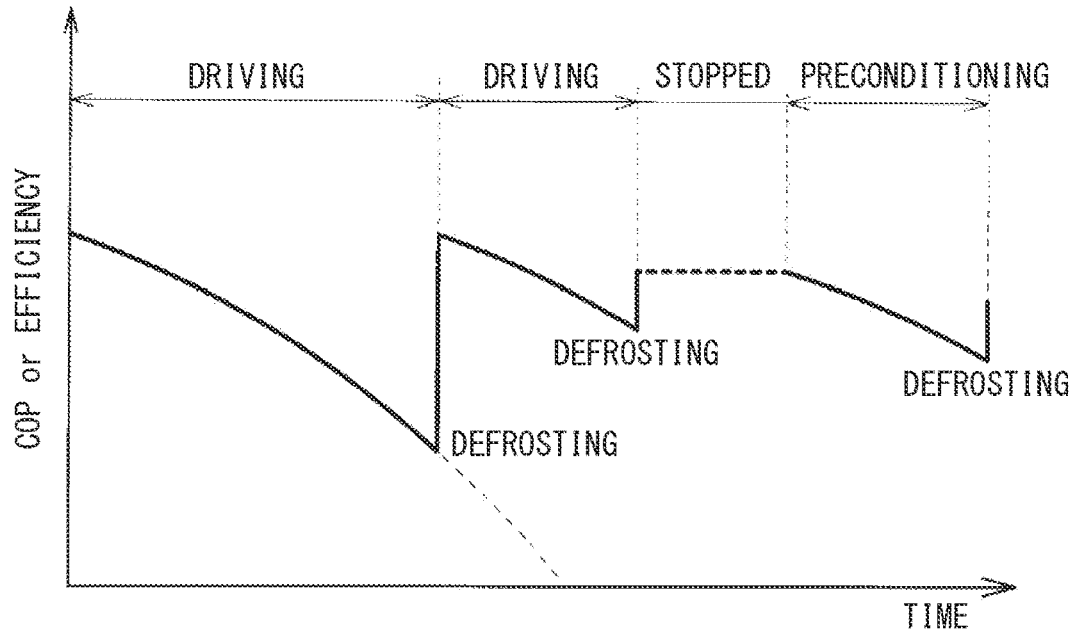
FIG. 7 is a timeline chart illustrating an operation example of the refrigeration cycle device in the first embodiment.

FIG. 7 is a timeline chart illustrating an example of a control result in the present embodiment. FIG. 7 illustrates a temporal transition of a coefficient of performance (so-called COP) or performance of the refrigeration cycle device 10 in a case where the waste-heat defrosting mode is performed during traveling of the vehicle, at the time of stopping of the vehicle, and at the time of the pre-air conditioning. Although the coefficient of performance or the performance is reduced along with proceeding of the frosting on the common radiator 45, the coefficient of performance or the performance is recovered with the defrosting of the common radiator 45 by performing the waste-heat defrosting mode.

Figure 8:
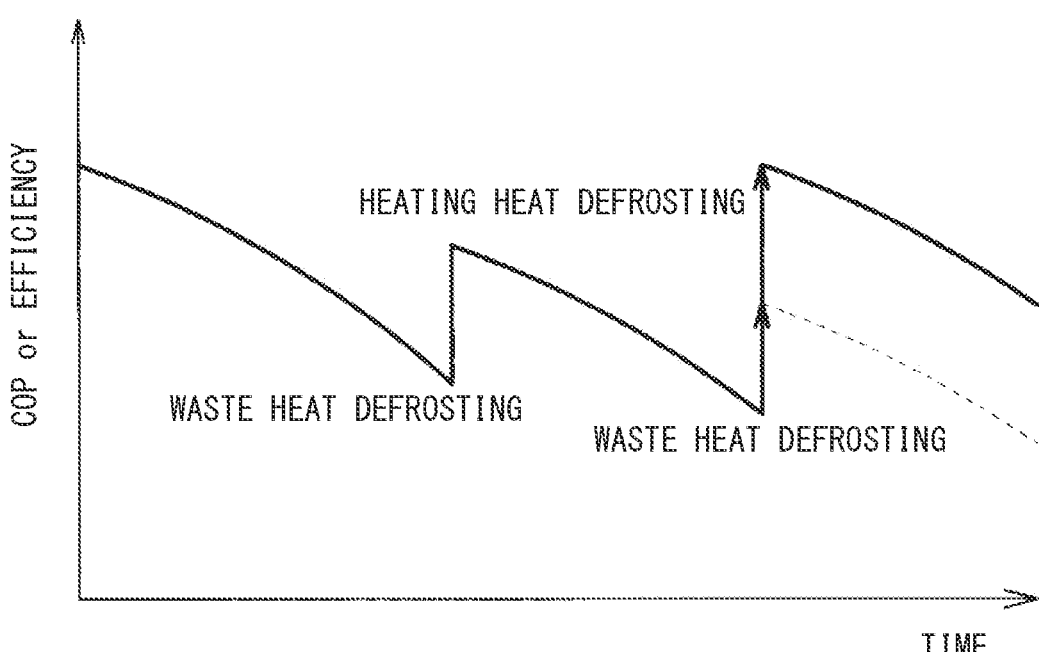
FIG. 8 is a timeline chart illustrating another operation example of the refrigeration cycle device in the first embodiment.

FIG. 8 illustrates a temporal transition of a coefficient of performance (so-called COP) or performance of the refrigeration cycle device 10 in a case where the mode is switched from the waste-heat defrosting mode to the heating-heat defrosting mode. In this case, the coefficient of performance or the performance can be recovered to a high level as compared with the case in which only the waste-heat defrosting mode is performed because the defrosting can be continued with the heating-heat defrosting mode even when the defrosting cannot be completed with the waste-heat defrosting mode.

In the present embodiment, the controller 60 determines whether the common radiator 45 is required to be defrosted. When determination is made that the common radiator 45 is not required to be defrosted, the coolant is caused to circulate separately in each of the heat storage circuit 80, the high-temperature coolant circuit 20, and the low-temperature coolant circuit 30. When determination is made that the common radiator 45 is required to be defrosted, the first three-way valve 26 or the second three-way valve is controlled to cause the coolant in the heat storage circuit 80 or the coolant in the high-temperature coolant circuit 20 to circulate through the common radiator 45.

Thus, the common radiator 45 can be reliably defrosted when the common radiator 45 is required to be defrosted, and therefore efficient defrosting can be performed.

In the present embodiment, in the heat storage circuit 80, the coolant circulates through the waste-heat generating device 82 to store the waste heat of the waste-heat generating device 82. Thus, the waste heat can be effectively used for defrosting, and therefore the defrosting can be performed in an energy saving manner.

In the present embodiment, the controller 60 controls the first three-way valve 26 or the second three-way valve to cause the coolant in the high-temperature coolant circuit 20 to flow in parallel through the heater core 22 and the common radiator 45, when the controller 60 determines that the common radiator 45 is required to be defrosted. Thus, part of heat generated with heating can be used for defrosting, and therefore the defrosting can be reliably performed.

In the present embodiment, the controller 60 controls the first three-way valve 26 or the second three-way valve to cause the coolant in the heat storage circuit 80 to circulate through the common radiator 45, when the controller 60 determines that the common radiator 45 is required to be defrosted. The controller 60 controls the first three-way valve 26 or the second three-way valve to cause the coolant in the high-temperature coolant circuit 20 to flow in parallel through the heater core 22 and the common radiator 45, when the controller 60 determines that the common radiator 45 is required to be defrosted after the coolant in the heat storage circuit 80 is caused to circulate through the common radiator 45.

Thus, defrosting is performed by using the heat generated with heating even when the defrosting cannot be completed by using the waste heat, and therefore the defrosting can be performed in an energy saving manner and in a reliable manner.

In the present embodiment, the controller 60 determines that the common radiator 45 is required to be defrosted, when the common radiator 45 is in a frosted state, and the temperature TWW of the coolant in the heat storage circuit 80 is higher than the waste-heat defrosting temperature $\alpha 1$ or the temperature TWH of the coolant in the high-temperature coolant circuit 20 is higher than the heating-heat defrosting temperature $\alpha 2$, in a case where the vehicle travels.

Thus, appropriate determination can be made that the common radiator 45 is required to be defrosted, and therefore efficient defrosting can be performed.

In the present embodiment, the controller 60 determines that the common radiator 45 is required to be defrosted, when the common radiator 45 is in the frosted state, and the temperature TWW of the coolant in the heat storage circuit 80 is higher than the waste-heat defrosting temperature $\alpha 1$ or the temperature TWH of the coolant in the high-temperature coolant circuit 20 is higher than the heating-heat defrosting temperature $\alpha 2$, in a case where the pre-air conditioning is performed. Thus, defrosting can be performed while reduction in comfortableness in air conditioning for the occupant is minimized as much as possible.

In the present embodiment, the controller 60 determines that the common radiator 45 is required to be defrosted, when the common radiator 45 is in the frosted state in a case where the state of the vehicle is switched from a traveling state to a stopped state. Thus, defrosting can be performed by effectively using the remaining heat generated while the vehicle travels, and therefore the defrosting can be performed in an energy saving manner.

In the present embodiment, the controller 60 determines that the common radiator 45 is required to be defrosted, when the common radiator 45 is in the frosted state in a case where the pre-air conditioning is completed. Thus, defrosting can be performed by effectively using the remaining heat that has been generated for air conditioning started before the occupant gets in the vehicle, and therefore the defrosting can be performed in an energy saving manner.

In the present embodiment, the controller 60 determines whether the common radiator 45 is in the frosted state based on the temperature TWR of the coolant flowing through the common radiator 45 and the temperature Tam of the outside air. Thus, accurate determination for the frosted state can be made with simple control.

Second Embodiment

Figure 9:
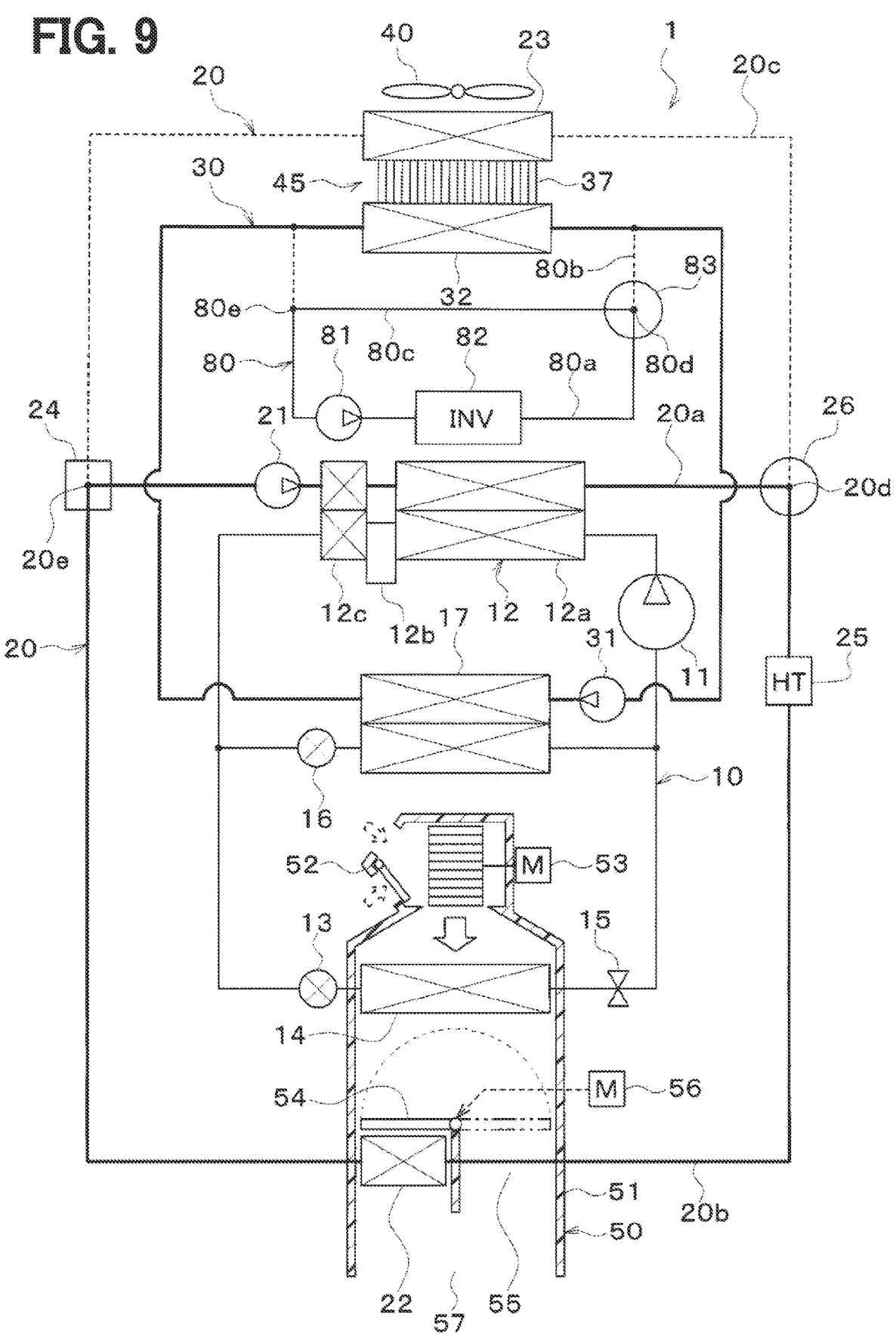
FIG. 9 is an overall configuration diagram of a refrigeration cycle device in a second embodiment.

In the first embodiment, the radiator flow path 20c in the high-temperature coolant circuit 20, the low-temperature coolant circuit 30, and the defrosting flow path 80b in the heat storage circuit 80 merge with one another. The common radiator 45 is disposed at the merging portion. In the present embodiment, as illustrated in FIG. 9, the radiator flow path 20c in the high-temperature coolant circuit 20 does not merge with the low-temperature coolant circuit 30 and the defrosting flow path 80b in the heat storage circuit 80. The common radiator 45 includes a high-temperature-side radiator 23 that is disposed in the radiator flow path 20c in the high-temperature coolant circuit 20, and a low-temperature-side radiator 32 that is disposed in a merging portion where the low-temperature coolant circuit 30 and the defrosting flow path 80b merge with each other.

The low-temperature-side radiator 32 is a first heat medium flowing unit of the common radiator 45, and the high-temperature-side radiator 23 is a second heat medium flowing unit of the common radiator 45.

The high-temperature-side radiator 23 is a radiator that exchanges heat between the coolant in the high-temperature coolant circuit 20 and the outside air, to cause the coolant to release heat to the outside air. The low-temperature-side radiator 32 is an outside-air heat absorption unit that exchanges heat between the coolant in the low-temperature coolant circuit 30 and the outside air, to cause the coolant in the low-temperature coolant circuit 30 to absorb heat from the outside air. The high-temperature-side radiator 23 and the low-temperature-side radiator 32 are joined to each other by a common fin 37.

The common fin 37 is a heat exchange enhancement member that enhances heat exchange between the coolant and the air. The common fin 37 is a member made of a metal (for example, aluminum). The common fin 37 is a coupling part with which the high-temperature-side radiator 23 and the low-temperature-side radiator 32 are coupled through a metal, and that thereby causes heat to be transferred from the high-temperature-side radiator 23 to the low-temperature-side radiator 32. The common fin 37 is a heat transfer member that connects the high-temperature-side radiator 23 and the low-temperature-side radiator 32 in a heat-transferable manner.

The high-temperature-side radiator 23 and the low-temperature-side radiator 32 are disposed in series in this order in the flow direction of the outside air. The outdoor blower 40 blows the outside air to the high-temperature-side radiator 23 and the low-temperature-side radiator 32.

In the cooling mode, the controller 60 controls the first three-way valve 26 to open both the heater core flow path 20b and the radiator flow path 20c. As a result, in the cooling mode, the coolant in the high-temperature coolant circuit 20 circulates through the high-temperature-side radiator 23, and releases heat to the outside air in the high-temperature-side radiator 23.

In the dehumidifying and heating mode, the controller 60 controls the first three-way valve 26 to open the heater core flow path 20b and to close the radiator flow path 20c. As a result, in the dehumidifying and heating mode, the coolant in the low-temperature coolant circuit 30 absorbs heat from the outside air, in the low-temperature-side radiator 32.

In the heating mode, the controller 60 controls the first three-way valve 26 to open the heater core flow path 20b and to close the radiator flow path 20c. As a result, in the heating mode, the coolant in the low-temperature coolant circuit 30 absorbs heat from the outside air, in the low-temperature-side radiator 32.

In the waste-heat defrosting mode, the controller 60 stops the low-temperature-side pump 31, while the controller 60 controls the second three-way valve 83 to cause the coolant in the waste-heat generating device flow path 80a of the heat storage circuit 80 to flow through the low-temperature-side radiator 32. As a result, the frost adhering to the surface of the low-temperature-side radiator 32 can be melted by the heat of the coolant in the heat storage circuit 80 flowing through the low-temperature-side radiator 32.

Figure 10:
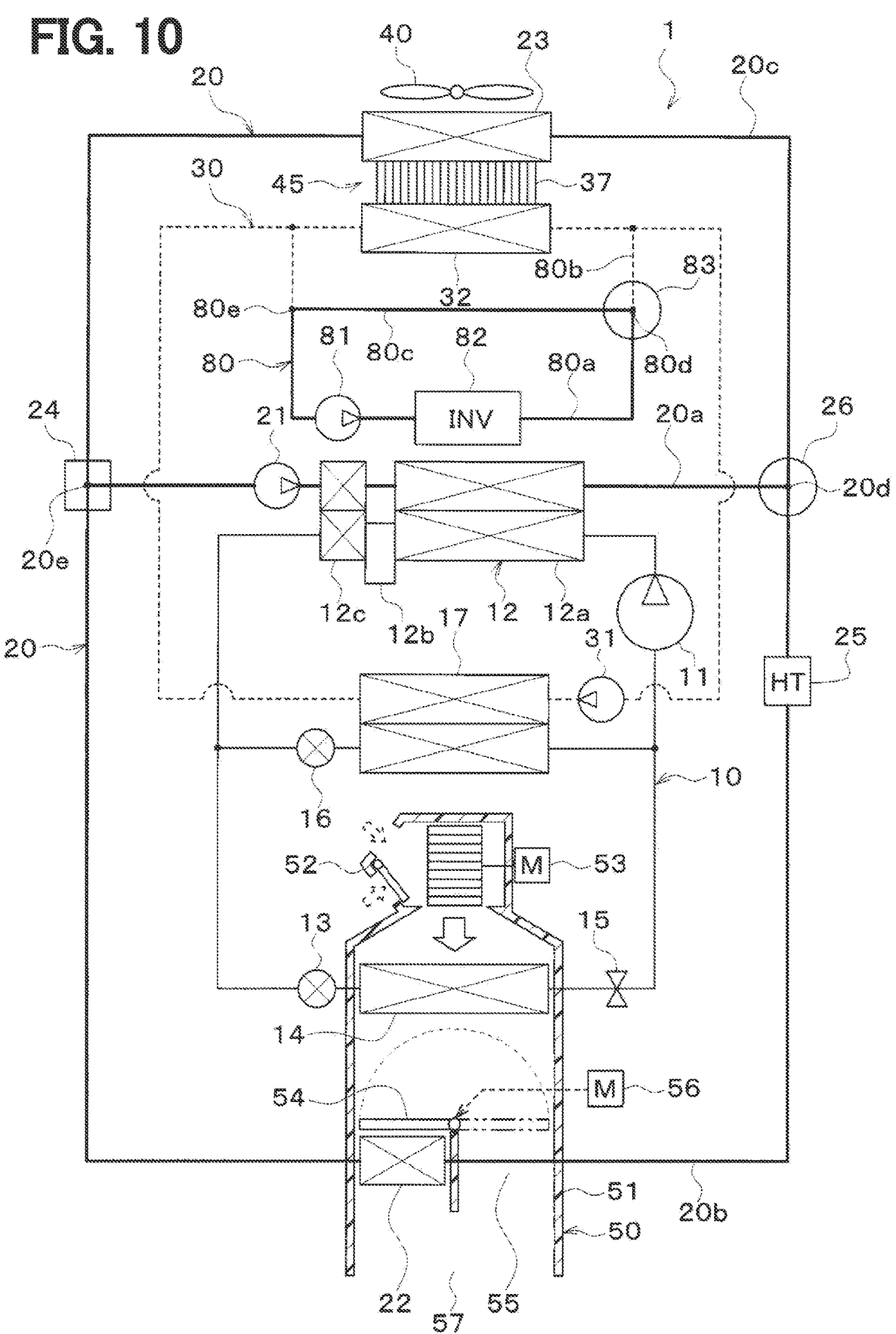
FIG. 10 is an overall configuration diagram illustrating an operation state of the refrigeration cycle device in the second embodiment in a heating-heat defrosting mode.

In the heating-heat defrosting mode, the controller 60 stops the low-temperature-side pump 31, while the controller 60 controls the first three-way valve 26 to cause the coolant in the radiator flow path 20c of the high-temperature coolant circuit 20 to flow through the high-temperature-side radiator 23, as indicated by a thick arrow in FIG. 10.

The high-temperature-side radiator 23 and the low-temperature-side radiator 32 are connected to each other in a heat-transferable manner by the common fin 37. The heat of the coolant in the high-temperature coolant circuit 20 flowing through the high-temperature-side radiator 23 thus transfers to the low-temperature-side radiator 32 through the fin 37.

In this manner, the frost adhering to the surface of the low-temperature-side radiator 32 can be melted by the heat supplied to the low-temperature-side radiator 32.

In the present embodiment, the common radiator 45 includes the low-temperature-side radiator 32 through which the coolant cooled in the coolant-side evaporator 17 flows, the high-temperature-side radiator 23 through which the coolant heated in the electric heater 25 flows, and the fins 37 that connects the low-temperature-side radiator 32 and the high-temperature-side radiator 23 in a heat-transferable manner.

As a result, defrosting can be performed while the coolant cooled in the coolant-side evaporator 17 and the coolant heated in the electric heater 25 are not mixed. The coolants with different temperature zones can be efficiently managed.

Third Embodiment

In the above embodiments, the mode is shifted from the waste-heat defrosting mode to the heating-heat defrosting mode to improve defrosting capability, when sufficient defrosting cannot be achieved with the waste-heat defrosting mode. However, in the present embodiment, defrosting is made by performing only the heating-heat defrosting mode without performing the waste-heat defrosting mode, as illustrated in FIG. 11.

Figure 11:
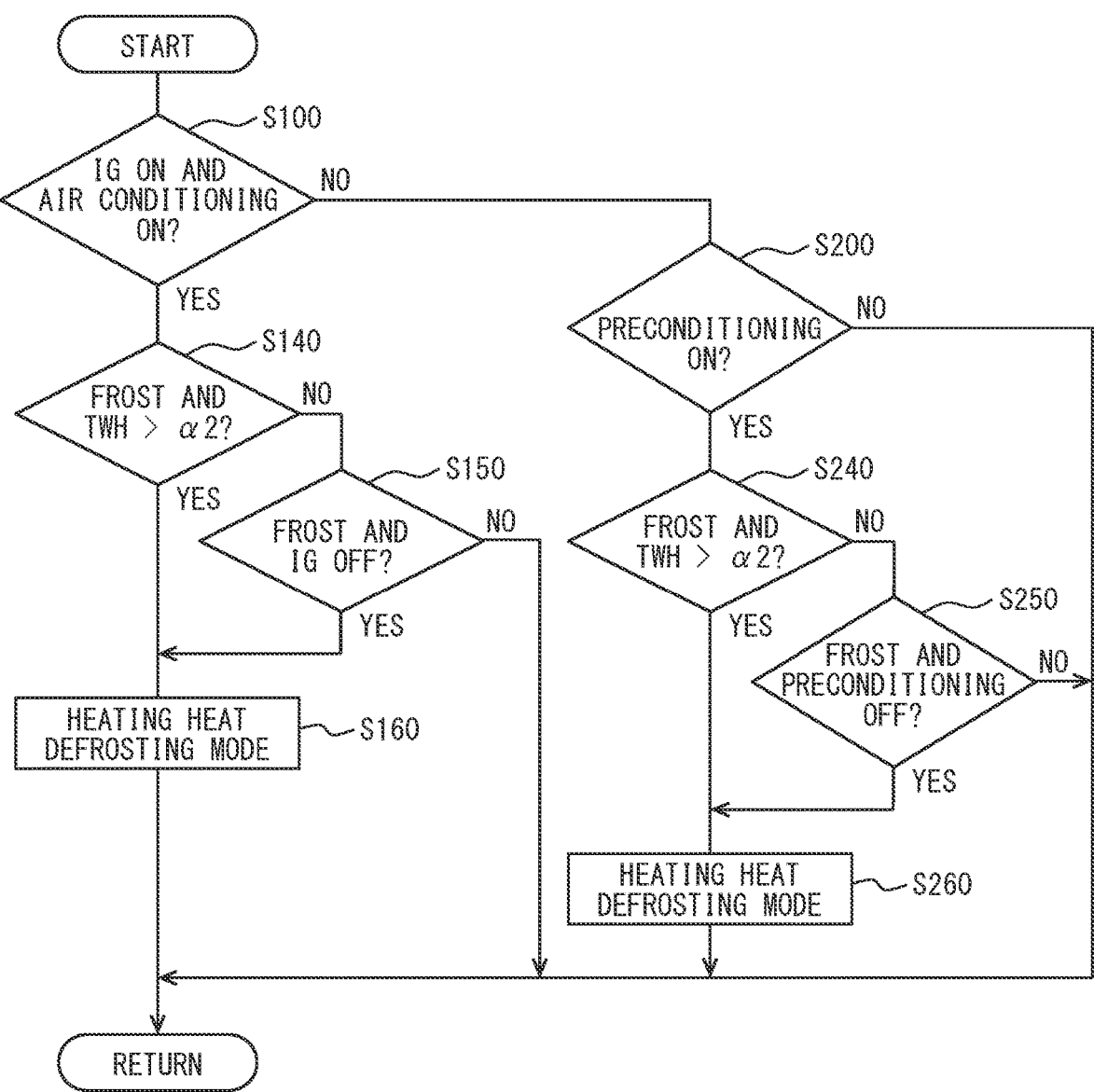
FIG. 11 is a flowchart illustrating control processing performed based on a control program in a third embodiment.

In the flowchart in the present embodiment, illustrated in FIG. 11, the steps related to the waste-heat heating mode are deleted compared with the flowchart in the first embodiment, illustrated in FIG. 5.

Figure 12:
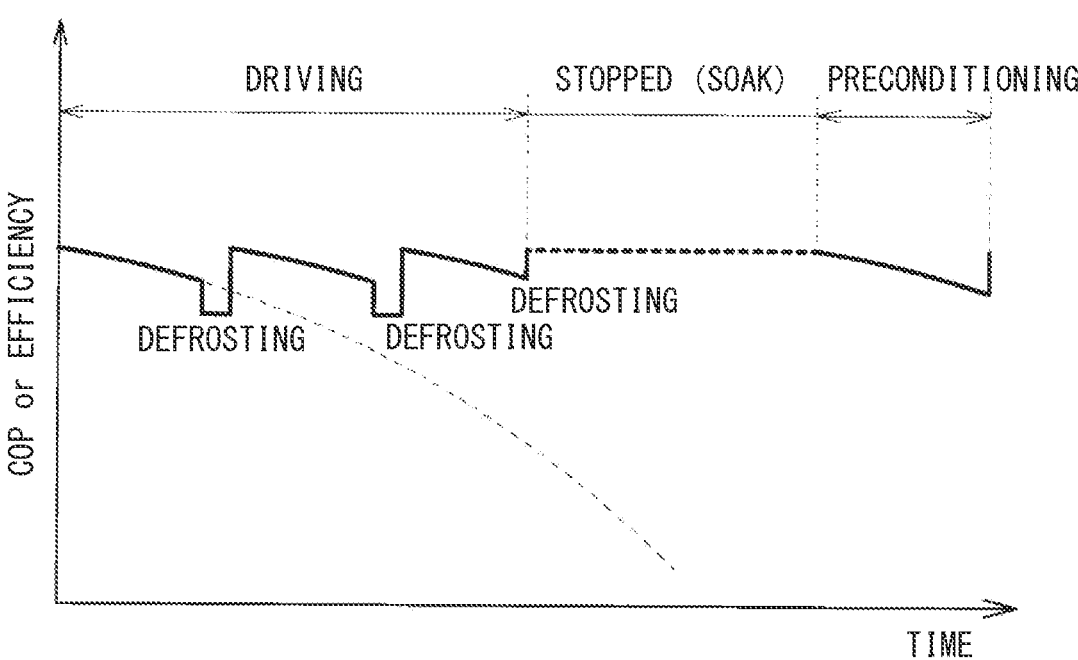
FIG. 12 is a timeline chart illustrating an operation example of the refrigeration cycle device in the third embodiment.

FIG. 12 illustrates a temporal transition of a coefficient of performance (so-called COP) or performance of the refrigeration cycle device 10 in a case where the heating-heat defrosting mode is performed during traveling of the vehicle, at the time of stopping of the vehicle, and at the time of the pre-air conditioning. Although the coefficient of performance or the performance is temporarily reduced because part of the heat generated with heating is used for defrosting instead of the heating, the coefficient of performance or the performance is recovered by defrosting the common radiator 45.

The present disclosure is not limited to the embodiments described above, and can be variously modified as follows without departing from the gist of the present disclosure.

In the above embodiments, the coolant is used as the heat medium. However, various media such as oil and the like may be used as the heat medium. A nanofluid may be used as the heat medium. A nanofluid is a fluid in which nanoparticles having a particle diameter on the order of nanometers are mixed.

In the refrigeration cycle device 10 in each of the above embodiments, a fluorocarbon refrigerant is used as the refrigerant. However, the type of the refrigerant is not limited to a fluorocarbon refrigerant, and a natural refrigerant such as carbon dioxide or a hydrocarbon refrigerant may be used.

The refrigeration cycle device 10 in each of the above embodiments forms a subcritical refrigeration cycle in which the high-pressure-side refrigerant pressure does not exceed the critical pressure of the refrigerant. However, the refrigeration cycle device 10 may form a supercritical refrigeration cycle in which the high-pressure-side refrigerant pressure exceeds the critical pressure of the refrigerant.

In the second embodiment, the high-temperature-side radiator 23 and the low-temperature-side radiator 32 are separate radiators, and the high-temperature-side radiator 23 and the low-temperature-side radiator 32 are joined to each other by the common fin 37. However, the high-temperature-side radiator 23 and the low-temperature-side radiator 32 may form one radiator.

The high-temperature-side radiator 23 and the low-temperature-side radiator 32 may form one radiator, for example, by integrating a coolant tank of the high-temperature-side radiator 23 and a coolant tank of the low-temperature-side radiator 32 with each other.

In the above embodiments, the electric heater 25 is disposed at the location that is on the downstream side of the branching part 20d and that is on the upstream side of the heater core 22, in the high-temperature coolant circuit 20. However, the location of the electric heater 25 in the high-temperature coolant circuit 20 is not limited to this.

For example, the electric heater 25 may be disposed at a location that is on the downstream side of the condenser 12 and that is on the upstream side of the branching part 20d, in the high-temperature coolant circuit 20. In this case, the flow of the coolant in the heater core flow path 20b may be stopped by closing the heater core flow path 20b using the first three-way valve 26, in the heating-heat defrosting mode.

Although the present disclosure has been described in accordance with the embodiments, it is understood that the present disclosure is not limited to the embodiments and structures. The present disclosure also includes various modifications and variations within the scope of equivalents. In addition, various combinations or forms, or other combinations or forms, in which only one element, one or more elements, or one or less elements are added to the various combinations or forms, are also within the scope and idea of the present disclosure.

What is claimed is:

1. A refrigeration cycle device comprising:
a compressor configured to suck, compress, and discharge a refrigerant;
a heat radiation unit configured to cause the refrigerant discharged from the compressor to release heat;
a decompression unit configured to decompress the refrigerant having released heat in the heat radiation unit;
an evaporation unit configured to exchange heat between the refrigerant decompressed in the decompression unit and a heat medium to evaporate the refrigerant and to cool the heat medium;
an outside-air heat absorption unit configured to cause the heat medium cooled in the evaporation unit to absorb heat from outside air;
a heat source configured to release heat to the heat medium to heat the heat medium;
a first circulation circuit configured to cause the heat medium to circulate through the heat source;

a second circulation circuit configured to cause the heat medium to circulate between the evaporation unit and the outside-air heat absorption unit; and
a flow path switching unit configured to determine whether the outside-air heat absorption unit is required to be defrosted, the flow path switching unit being configured to:
cause the heat medium to circulate separately between the first circulation circuit and the second circulation circuit, when it is determined that the outside-air heat absorption unit is not required to be defrosted; and
switch a flow path of the heat medium to cause the heat medium in the first circulation circuit to circulate through the outside-air heat absorption unit, when it is determined that the outside-air heat absorption unit is required to be defrosted,
the refrigeration cycle device further comprising an air heating unit configured to cause the heat medium to release heat to air to be blown into a cabin of a vehicle to heat the air,
the heat radiation unit is configured to cause the refrigerant discharged from the compressor to release heat to the heat medium,
the heat source includes:
a first heat source configured to release waste heat generated along with operation of the first heat source to the heat medium; and
a second heat source configured to generate heat that heats the air,
the first circulation circuit includes:
a heat storage circuit in which the heat medium circulates through the first heat source to store the waste heat of the first heat source; and
a heating circuit configured to cause the heat medium to circulate through the heat radiation unit, the second heat source, and the air heating unit, and
the flow path switching unit is configured to:
switch the flow path of the heat medium to cause the heat medium in the heat storage circuit to circulate through the outside-air heat absorption unit without circulating through the second heat source and the air heating unit, when the flow path switching unit determines that the outside-air heat absorption unit is required to be defrosted; and
switch the flow path of the heat medium to cause the heat medium in the heating circuit to flow in parallel through the heat radiation unit and the outside-air heat absorption unit without circulating through the first heat source, when the flow path switching unit determines that the outside-air heat absorption unit is required to be defrosted after the heat medium in the heat storage circuit is caused to circulate through the outside-air heat absorption unit.

2. The refrigeration cycle device according to claim 1, wherein the flow path switching unit determines that the outside-air heat absorption unit is required to be defrosted, when the outside-air heat absorption unit is in a frosted state and a temperature of the heat medium in the first circulation circuit is higher than a predetermined temperature when the vehicle is traveling.

3. The refrigeration cycle device according to claim 1, wherein the flow path switching unit determines that the outside-air heat absorption unit is required to be defrosted, when the outside-air heat absorption unit is in a frosted state and a temperature of the heat medium in the first circulation circuit is higher than a predetermined temperature in a case where air conditioning is being performed before an occupant gets in a vehicle.

4. The refrigeration cycle device according to claim 1, wherein the flow path switching unit determines that the outside-air heat absorption unit is required to be defrosted, when the outside-air heat absorption unit is in a frosted state in a case where a state of a vehicle is switched from a traveling state to a stopped state.

5. The refrigeration cycle device according to claim 1, wherein the flow path switching unit determines that the outside-air heat absorption unit is required to be defrosted, when the outside-air heat absorption unit is in a frosted state in a case where air conditioning before an occupant gets in a vehicle is completed.

6. The refrigeration cycle device according to claim 2, wherein the flow path switching unit determines whether the outside-air heat absorption unit is in a frosted state, based on a temperature of the heat medium flowing through the outside-air heat absorption unit and a temperature of the outside air.

7. The refrigeration cycle device according to claim 1, wherein the outside-air heat absorption unit includes:

a first heat medium flowing unit through which the heat medium cooled in the evaporation unit flows;

a second heat medium flowing unit through which the heat medium heated in the heat source flows; and a heat transfer member that connects the first heat medium flowing unit and the second heat medium flowing unit in a heat-transferable manner.

* * * * *